(12) United States Patent
Sugawa et al.

(10) Patent No.: US 8,897,644 B2
(45) Date of Patent: Nov. 25, 2014

(54) OPTICAL LINE TERMINAL AND OPTICAL NETWORK SYSTEM

(75) Inventors: Jun Sugawa, Kamakura (JP); Daisuke Mashimo, Tachikawa (JP); Hiroki Ikeda, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 239 days.

(21) Appl. No.: 13/535,405

(22) Filed: Jun. 28, 2012

(65) Prior Publication Data

US 2013/0004172 A1     Jan. 3, 2013

(30) Foreign Application Priority Data

Jun. 30, 2011    (JP) ................................. 2011-145120

(51) Int. Cl.
*H04B 10/00* (2013.01)
*H04J 3/16* (2006.01)
*H04J 14/02* (2006.01)
*H04B 10/272* (2013.01)

(52) U.S. Cl.
CPC .............. *H04J 3/1694* (2013.01); *H04J 14/025* (2013.01); *H04J 14/0246* (2013.01); *H04J 14/0267* (2013.01); *H04B 10/272* (2013.01); *H04J 14/0221* (2013.01)
USPC .............................................. 398/70; 398/72

(58) Field of Classification Search
USPC ...................... 398/202–214, 66–73
See application file for complete search history.

(56) References Cited

U.S. PATENT DOCUMENTS

| | | | | |
|---|---|---|---|---|
| 7,468,958 B2 * | 12/2008 | Emery et al. | ................... | 370/321 |
| 7,555,228 B2 * | 6/2009 | Ruegg et al. | ................... | 398/209 |
| 7,602,800 B2 | 10/2009 | Endo et al. | | |
| 7,822,063 B2 * | 10/2010 | Ryu et al. | ....................... | 370/468 |
| 7,925,156 B2 * | 4/2011 | Weber et al. | ..................... | 398/25 |
| 7,936,991 B2 * | 5/2011 | Sugawara et al. | ................ | 398/67 |
| 7,940,794 B2 * | 5/2011 | Zhang et al. | ................ | 370/468 |
| 8,005,362 B2 | 8/2011 | Sakamoto et al. | | |
| 8,041,217 B2 * | 10/2011 | Bouda | ............................. | 398/75 |
| 8,116,627 B2 * | 2/2012 | Ikeda et al. | ..................... | 398/66 |
| 8,320,760 B1 * | 11/2012 | Lam et al. | ....................... | 398/66 |
| 8,326,152 B2 * | 12/2012 | Van Veen et al. | ............... | 398/72 |
| 8,374,501 B2 * | 2/2013 | Yoshiuchi et al. | ............. | 398/33 |
| 8,374,508 B2 * | 2/2013 | Soto et al. | ..................... | 398/115 |
| 8,457,493 B2 * | 6/2013 | Mizutani | ........................ | 398/58 |
| 2004/0247246 A1 * | 12/2004 | Lee et al. | ........................ | 385/48 |
| 2006/0115271 A1 * | 6/2006 | Hwang et al. | .................. | 398/72 |
| 2007/0077069 A1 * | 4/2007 | Farmer et al. | ................... | 398/72 |

(Continued)

FOREIGN PATENT DOCUMENTS

| | | |
|---|---|---|
| CN | 101056146 A | 10/2007 |
| CN | 101360346 A | 2/2009 |

(Continued)

OTHER PUBLICATIONS

Z. Belfqih et al. "Enhanced Optical Budget System Performance of an Burst Extended PON at 10.7Gbit/s over 60km of Fibre", ECOC, Sep. 21-25, 2008, pp. 123-124, vol. 4, Brussels, Belgium.

(Continued)

Primary Examiner — Agustin Bello
(74) Attorney, Agent, or Firm — Crowell & Moring LLP

(57) ABSTRACT

Technology to provide linked control of bandwidth allocation to a plurality of optical network units among the plural wavelengths by a bandwidth allocation section coupled to the plural optical network units.

13 Claims, 18 Drawing Sheets

(56) References Cited

U.S. PATENT DOCUMENTS

| | | | |
|---|---|---|---|
| 2007/0127923 A1* | 6/2007 | Dalton et al. | 398/71 |
| 2007/0201867 A1* | 8/2007 | DeLew et al. | 398/38 |
| 2008/0095532 A1* | 4/2008 | Yamaji et al. | 398/17 |
| 2009/0060507 A1* | 3/2009 | Effenberger et al. | 398/60 |
| 2009/0162053 A1* | 6/2009 | Ikeda et al. | 398/25 |
| 2009/0180430 A1* | 7/2009 | Fadell | 370/329 |
| 2009/0190931 A1* | 7/2009 | Hamano et al. | 398/99 |
| 2009/0232501 A1* | 9/2009 | Dai | 398/66 |
| 2009/0290868 A1* | 11/2009 | Yin | 398/16 |
| 2010/0067901 A1* | 3/2010 | Mizutani et al. | 398/20 |
| 2010/0239255 A1 | 9/2010 | Ikeda et al. | |
| 2011/0020002 A1* | 1/2011 | Yoon et al. | 398/63 |
| 2011/0085795 A1 | 4/2011 | Ozaki | |
| 2011/0217041 A1 | 9/2011 | Yoshida et al. | |
| 2011/0255866 A1* | 10/2011 | Van Veen et al. | 398/35 |
| 2012/0057871 A1* | 3/2012 | Dai | 398/58 |
| 2012/0230684 A1* | 9/2012 | Effenberger et al. | 398/38 |
| 2012/0301145 A1* | 11/2012 | Kozaki et al. | 398/58 |
| 2013/0004172 A1* | 1/2013 | Sugawa et al. | 398/72 |
| 2013/0148962 A1* | 6/2013 | Heimbuch | 398/38 |
| 2013/0170834 A1* | 7/2013 | Cho et al. | 398/58 |
| 2013/0209094 A1* | 8/2013 | Jeong et al. | 398/34 |
| 2014/0018089 A1* | 1/2014 | Wu et al. | 455/452.1 |
| 2014/0112662 A1* | 4/2014 | Skubic et al. | 398/38 |

FOREIGN PATENT DOCUMENTS

| | | |
|---|---|---|
| CN | 101465696 A | 6/2009 |
| CN | 101841745 A | 9/2010 |
| CN | 101984777 A | 3/2011 |
| EP | 2 456 131 A1 | 5/2012 |
| JP | 2007-324885 A | 12/2007 |
| JP | 2009-152706 A | 7/2009 |
| JP | 2011-55407 A | 3/2011 |
| JP | 2011-82908 A | 4/2011 |
| JP | 2011-114667 A | 6/2011 |
| WO | WO 2011/007423 A1 | 1/2011 |

OTHER PUBLICATIONS

Shunji Kimura, "10-Gbit/s TDM-PON and over-40-Gbit/s WDM/TDM-PON systems with OPEX-effective burst-mode technologies", Optical Communications: Network, IEEE, 2009.

Part 3: "Carrier Sense Multiple Access with Collision Detection (CSMA/CD) Access Method and Physical Layer Specifications", IEEE Std 802.3av, 2009, (eleven (11) pages).

Japanese Office Action dated Jul. 29, 2014 (three (3) pages).

Chinese Office Action dated Aug. 5, 2014 (seven (7) pages).

* cited by examiner

FIG. 7

| WAVELENGTH IDENTIFIER λU | ONU IDENTIFIER ONU-ID | SOA INPUT POWER P_soa_in | INPUT POWER TYPE P_s |
|---|---|---|---|
| 1 | 1 | P_1-1 = −30 dBm | P_Low |
| 1 | 2 | P_1-2 = −23 dBm | P_Middle |
| 1 | 3 | P_1-3 = −12 dBm | P_High |
| 1 | 4 | P_1-4 = −30 dBm | P_Low |
| 1 | 5 | P_1-5 = −24 dBm | P_Middle |
| 2 | 1 | P_2-1 = −25 dBm | P_Middle |
| 2 | 2 | P_2-2 = −13 dBm | P_High |
| 2 | 3 | P_2-3 = −32 dBm | P_Low |
| 2 | 4 | P_2-4 = −30 dBm | P_Low |
| 3 | 1 | P_3-1 = −31 dBm | P_Low |
| 3 | 2 | P_3-2 = −13 dBm | P_High |
| 3 | 3 | P_3-3 = −12 dBm | P_High |
| 3 | 4 | P_3-4 = −25 dBm | P_Middle |
| 4 | 1 | P_4-1 = −25 dBm | P_Middle |
| 4 | 2 | P_4-2 = −13 dBm | P_High |
| 4 | 3 | P_4-3 = −28 dBm | P_Middle |
| 4 | 4 | P_4-4 = −12 dBm | P_High | great# OPTICAL LINE TERMINAL AND OPTICAL NETWORK SYSTEM

CLAIM OF PRIORITY

The present application claims priority from Japanese patent application JP 2011-145120 filed on Jun. 30, 2011, the content of which is hereby incorporated by reference into this application.

FIELD OF THE INVENTION

The present invention relates to a method for dynamic bandwidth control of optical line terminals (OLT) in wavelength-multiplexed Passive Optical Network (PON).

BACKGROUND OF THE INVENTION

[Spread of Optical Access Networks]

Along with the spread of the Internet, recently there has been an increasing need for high-speed network operation and usage of ADSL (Asymmetric Digital Subscriber Line), and B-PON (Broadband PON), E-PON (Ethernet PON), G-PON (Gigabit Capable PON) is becoming more widespread. The PON or passive optical network system in particular when connected between a network unit (ONU: optical network unit) installed in each user's home and the relay station (OLT: Optical line terminal) installed in each station connects each user via an optical splitter coupled to a single optical fiber from the OLT. This arrangement allows a low fiber installation cost as well as high-speed communication utilizing optical transmission so that usage is currently spreading widely throughout the world.

[TDM-PON System]

Among the PON systems, the TDM-PON system (Time Division Multiplexing) is utilized at different light wavelengths for downstream transmissions from the OLT to the ONU, and upstream transmissions from the ONU to OLT for time-divided signal sharing among the ONU (user units). The TDM-PON system is utilized in the B-PON, E-PON, G-PON, 10G-EPON, and XG-PON systems.

[DBA Control of TDM-PON]

In TDM-PON operation, the OLT manages the timing that optical signals are sent from the ONU in order to prevent conflicts between optical signals from the ONU in upstream transmissions. More specifically, the OLT sends a control frame to each ONU instructing at what periods transmit is allowed and ONU sends upstream control frame and upstream data during the period where transmission is allowed. Based on the volume of frame data received from the coupled terminals, the ONU sends a control frame to the OLT requesting a bandwidth space. Generally, DBA (Dynamic Bandwidth Allocation) control is utilized to dynamically manage the periods where transmit by the ONU is allowed based on the bandwidth space requested by the ONU.

Different types of control methods relating to this DBA are known in the art. The method in Japanese Unexamined Patent Application Publication No. 2009-152706 for example discloses a method that sets the DBA sequence so that the difference in reverse bias voltage becomes smaller, and regulates the reverse bias voltage in synchronization with the timing of transmissions from the ONU.

[WDM/TDM-PON System]

Rather than 10G-EPON or XG-PON, the WDM/TDM-PON systems that group TDM-PON of the related art into a plurality of wavelengths are considered as a more likely potential candidate for next-generation passive optical networking (PON). Technology relating to WDM/TDM-PON is disclosed for example in Japanese Unexamined Patent Application Publication No. 2011-55407 and S. Kimura, "10-Gbit/s TDM-PON and over-40-Gbit/s WDM/TDM-PON systems with OPEX-effective burst-mode technologies, "OFC2009, OWH-6, March 2009.

[Need for Multi-Branching and Line Extension in TDM-PON]

Techniques for multi-branching and line extension in TDM-PON are known to include utilizing optical amplifiers at the OLT for high output at the optical transmitter section and for high-sensitivity at the optical receiver section. Signals transmitted upstream in TDM-PON are burst signals whose amplitude widely fluctuates from strong to weak. The cause of the widely fluctuating strong and weak signals is the different distances between the OLT and each ONU, which consequently cause different optical loss in the optical fiber between allowable transmission loss in the PON zone. A method is disclosed in Z. BelFqih et al, "Enhanced Optical Budget System Performance of a Burst Extended PON at 10.7 Gbps over 60 km of Fibre", ECOC2008, Th2. F. 4. (2008), for example for expanding the allowable transmission loss by utilizing optical amplifiers in the G-PON.

SUMMARY

[Need for Multi-Branching and Line Extension in WDM/TDM-PON]

Even within WDM/TDM-PON system multi-branching and line extension achieved through use of an optical amplifier are needed.

[OLT Configuration Example 1]

The utilization of an optical amplifier in the OLT configuration example 1 to achieve multi-branching and line extensions in the WDM/TDM-PON systems is described next while referring to FIG. 2.

The OLT is comprised of a wavelength division multiplexing coupler 101, an EDFA (Erbium-Doped Optical Fiber Amplifier) 111, a SOA (Semiconductor Optical Amplifier) 121-124, a wavelength division multiplexing coupler 102, the optical transceivers 131-134, the OLT PHY/MAC processor sections 141-144, the DBA control sections 151-154, and the NNI processor sections 161-164. The description here utilizes an SOA and an EDFA as one example of optical amplifier but the optical amplifiers are not limited to the amplifiers described here.

In this configuration, the SOA121, 122, 123, and 124 amplify the respective upstream optical signals wavelength $\lambda U1$, wavelength $\lambda U2$, wavelength $\lambda U3$, wavelength $\lambda U4$; and the EDFA111 amplifies the respective downstream optical signals wavelength $\lambda D1$, wavelength $\lambda D2$, wavelength $\lambda D3$, and wavelength $\lambda D4$.

In this configuration, one SOA amplifies each of the upstream wavelength signals. The optical power input to the SOA is not so high, and therefore deformation on the amplified optical waveform does not happen. However, a total of four SOA are needed which requires increased cost and a larger mounting area.

[OLT Configuration Example 2]

An OLT configuration example 2 for achieving multi-branching and line extensions in WDM/TDM-PON systems is described next while referring to FIG. 3.

The OLT is comprised of a wavelength division multiplexing coupler 103, an EDFA (Erbium-Doped Optical Fiber Amplifier) 111, a SOA (Semiconductor Optical Amplifier) 125, a wavelength division multiplexing coupler 104, the optical transceiver sections 131-134, the OLT PHY/MAC processor sections 141-144, a DBA control section 151-154, and the NNI processor sections 161-164. The description here utilizes an SOA and an EDFA as one example of the optical amplifier but the optical amplifiers are not limited to the amplifiers described here.

In this configuration, a single SOA125 amplifies the upstream optical signals wavelength λU1, wavelength λU2, wavelength λU3, wavelength λU4; and the EDFA111 amplifies the respective downstream optical signals wavelength λD1, wavelength λD2, wavelength λD3, and wavelength λD4.

In this configuration, one SOA amplifies an upstream four wavelength portion, and there is separate DBA control of each wavelength.

[Example of Upstream Optical Signal for OLT Configuration Example 2]

However, in the OLT in configuration example 2, the OLT simultaneously receives optical signals on a plurality of wavelengths sent from nearby ONU during the receive period, the total optical power for the optical signal input to the SOA becomes large during this time, saturating the SOA so the amplified optical waveform becomes distorted, causing the possibility that normal processing of the received optical signal might become impossible.

The operation in the configuration example 2 when the total optical signal input power to the SOA reaches or exceeds a specified value and saturates is described using FIG. 5.

FIG. 5 shows the optical power on each wavelength input to the SOA, the total optical power input to the SOA, the SOA injection electrical current, and the time transition for the total optical power output from the SOA. In this example, one can see that the total SOA input power becomes large in the simultaneous receive period (t1) for the ONU1-3, ONU2-2, ONU3-2, ONU4-2. In the configuration example 2, the SOA operates from a fixed injection current. The SOA output power therefore becomes large and exceeds the saturation level in the period (t1) where optical signals from the ONU1-3, ONU2-2, ONU3-2, ONU4-2 are simultaneously received. The SOA output waveform on each wavelength therefore deteriorates in this period. Separately controlling each wavelength by the DBA control for TDM-POM systems in the related art including patent literature 2 will cause the SOA output waveform to deteriorate even further due to saturation.

Therefore, achieving multi-branching and line extension in WDM/TDM-PON systems preferably requires the capability to amplify upstream optical signals on the plural wavelengths with a single optical amplifier and moreover prevent waveform degradation due to saturation of the optical amplifier.

In view of the aforementioned problems, the present invention has the object of collectively amplifying upstream optical signals on plural wavelengths and moreover preventing waveform degradation due to saturation in the optical amplifier.

The present invention is comprised of a first receiver section to receive optical wavelength multiplexed signals that are optical multiplexed signals from a plurality of subscriber devices (or customer equipment); a bandwidth allocation control section to allocate transmit bandwidths to each subscriber device based on the bandwidth allocation request from the optical line terminals contained within the optical wavelength multiplexed signals received by way of the first receiver section; and a transmitter section to transmit band allocation information containing information on the transmit bandwidth allocated by the bandwidth allocation control section to the subscriber devices; and in which the bandwidth allocation control section decides the transmit band to allocate for the transmit bandwidth serving as the first bandwidth for the subscriber devices based on a bandwidth allocation request from the plurality of subscriber devices on a transmit wavelength that is the first wavelength, and a bandwidth allocation request from the plurality of subscriber devices on a transmit wavelength serving as the second wavelength.

The present invention is capable of providing a WDM/TDM-PON system with multi-branching and line extension capability at a low cost.

BRIEF DESCRIPTION OF THE DRAWINGS

FIG. 7 is a drawing showing an example of the ONU power management table retained by the OLT in the present invention;

DETAILED DESCRIPTION OF THE PREFERRED EMBODIMENT

Figure 1:
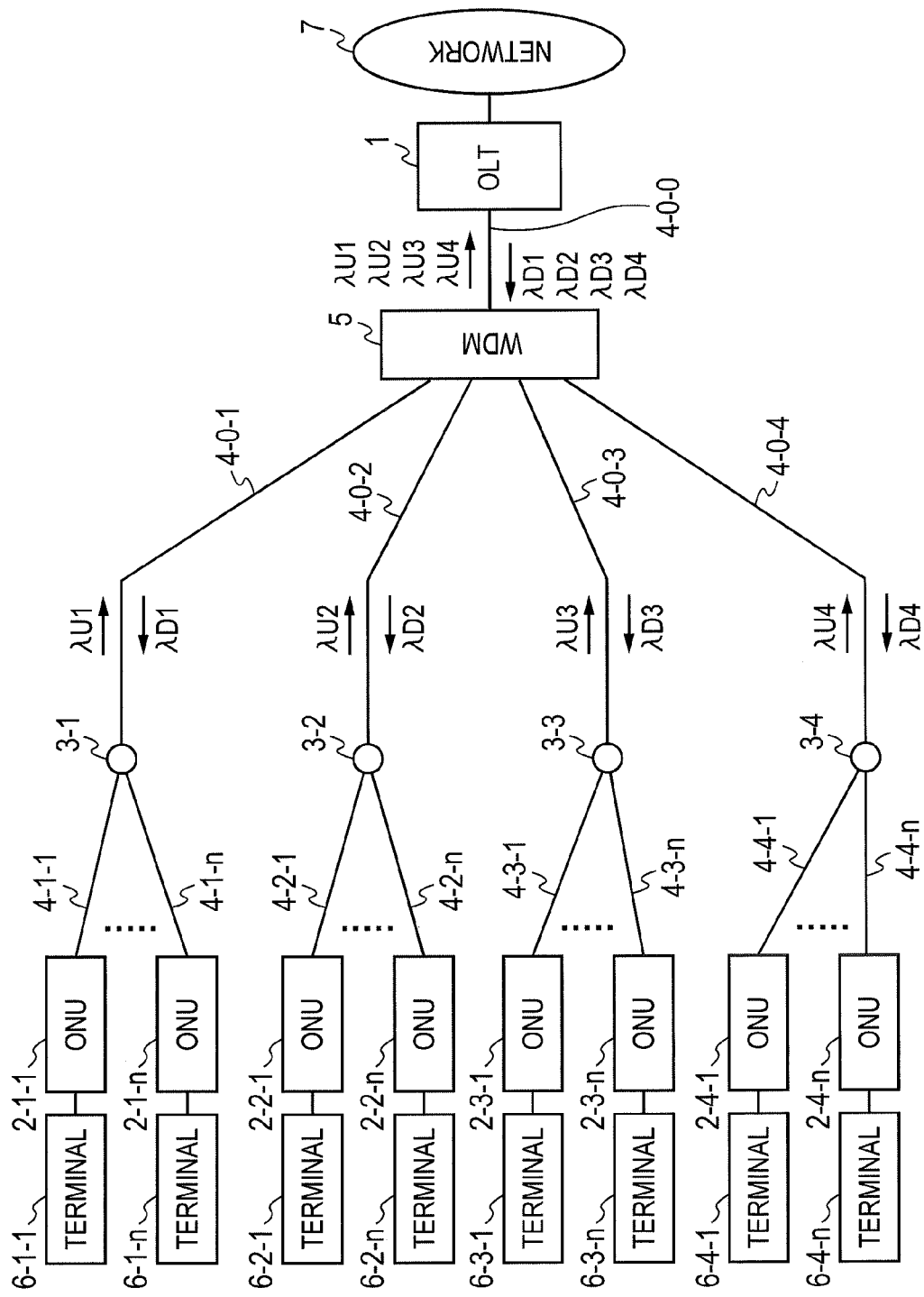
FIG. 1 is a diagram of the WDM/TDM-PON system.
Figure 2:
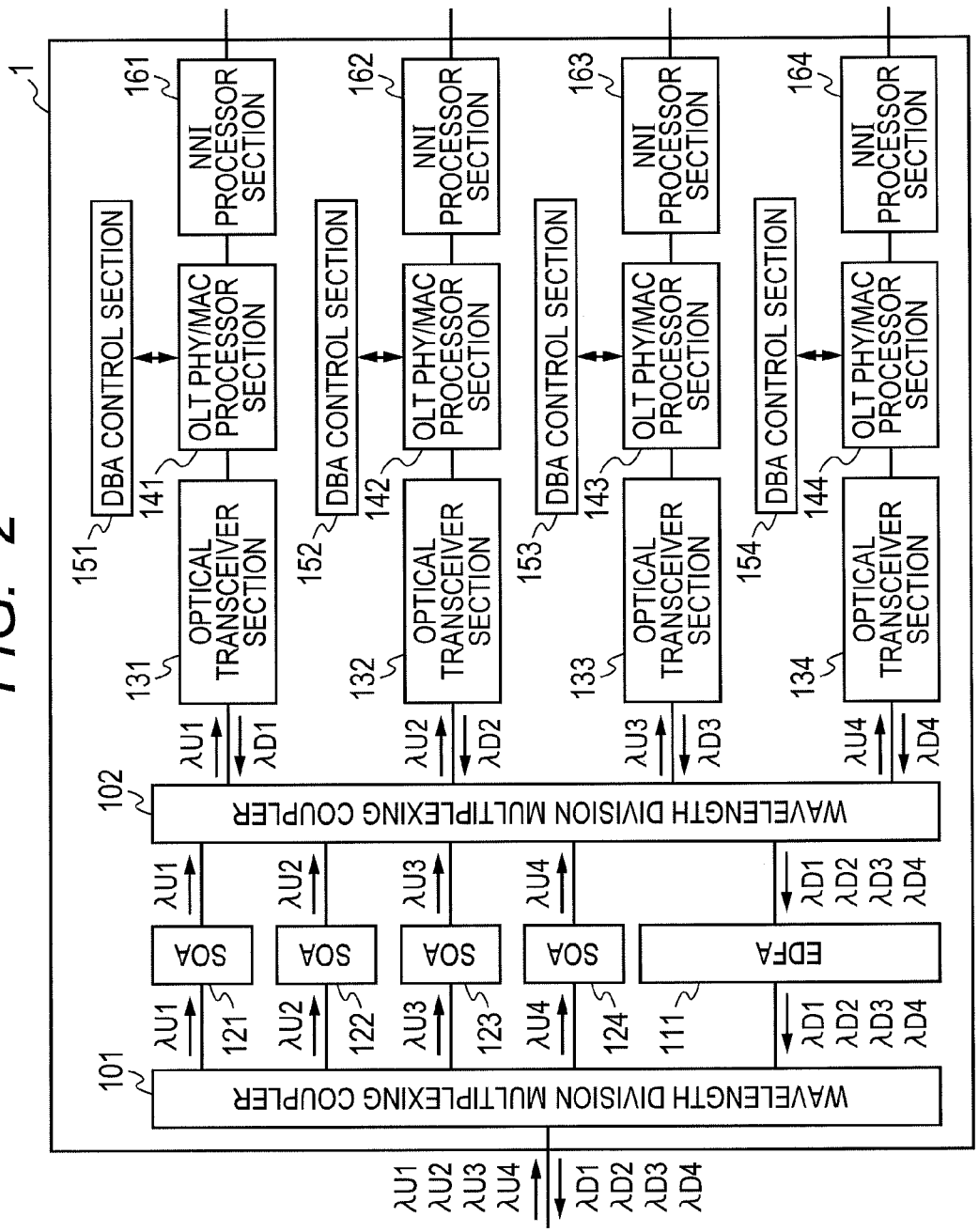
FIG. 2 is a block diagram of the configuration example 1 of the OLT of the related art.
Figure 3:
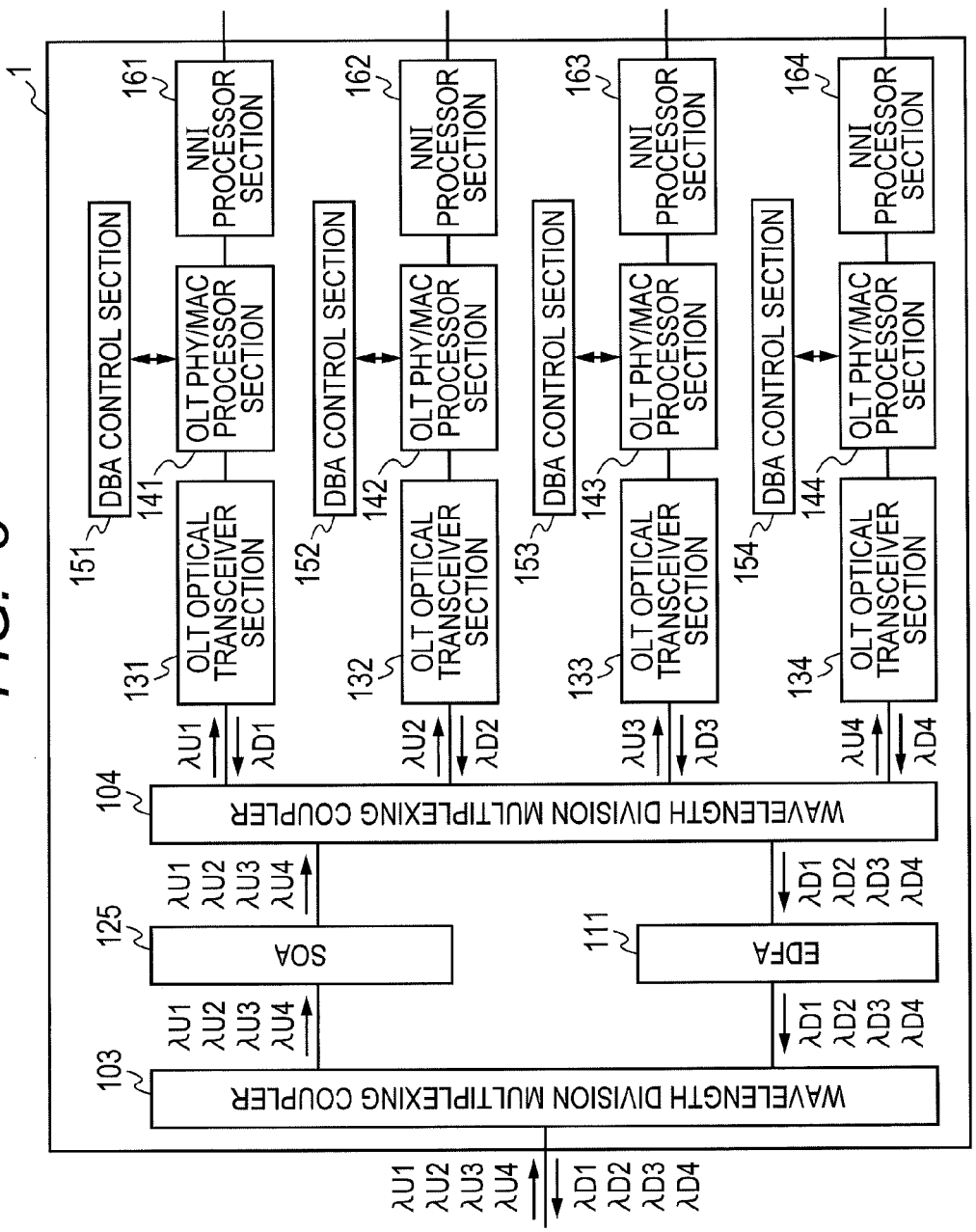
FIG. 3 is a block diagram of the configuration example 2 of the OLT of the related art.

The embodiments of the present invention are described next in detail while referring to the drawings. Components common to each drawing are assigned the same reference numerals. Unless specified otherwise, the description of the control frame in the PON zone is made based on the MPCP control frame defined by the 10G-EPON standards.

First Embodiment

[WDM/TDM-PON System Configuration]

FIG. 1 is a diagram showing the optical access network for the WDM/TDM-PON system. The optical access network is comprised of an OLT1, a wavelength division multiplexing coupler (WDM couple) 5, optical splitter 3 (3-1 through 3-4), plural ONU 2 (2-1-1 through 2-4-$n$), and plural terminals 6 (6-1-1 through 6-4-$n$). The OLT1 is coupled to the wavelength division multiplexing coupler 5 by way of the main line of the optical fiber 4-0-0. The wavelength division multiplexing coupler 5 is coupled to the optical splitters 3-1, 3-2, 3-3, and 3-4 by way of the optical fibers 4-0-1, 4-0-2, 4-0-3, and 4-0-4. The optical splitter 3-1 is coupled to the ONU2-1-1 through 2-1-$n$ by way of the optical fiber 4-1-1 through 4-1-$n$. The terminals 6-1-1 through 6-4-$n$ are coupled to the respective ONU2-1-1 through 2-4-$n$.

Downstream transmission from the OLT to the ONU in the WDM/TDM-PON system is described first. The OLT1 sends an optical signal for wavelength $\lambda D1$ if sending an optical signal to the ONU2-1-1 through 2-1-$n$; sends an optical signal for wavelength $\lambda D2$ if sending an optical signal to the ONU2-2-1 through 2-2-$n$; sends an optical signal for wavelength $\lambda D3$ if sending an optical signal to the ONU2-3-1 through 2-3-$n$; and sends an optical signal for wavelength $\lambda D4$ if sending an optical signal to the ONU2-4-1 through 2-4-$n$. When the optical multiplexed wavelength signals that were multiplexed on the wavelengths $\lambda D1$, $\lambda D2$, $\lambda D3$, and $\lambda D4$ are input to the wavelength division multiplexing coupler 5, the optical signal for wavelength $\lambda D1$ is sent via the optical splitter 3-1 to the ONU2-1-1 through 2-1-$n$; the optical signal for wavelength $\lambda D2$ is sent via the optical splitter 3-2 to the ONU2-2-1 through 2-2-$n$; the optical signal for wavelength $\lambda D3$ is sent via the optical splitter 3-3 to the ONU2-3-1 through 2-3-$n$; and the optical signal for wavelength $\lambda D4$ is sent via the optical splitter 3-4 to the ONU2-4-1 through 2-4-$n$.

The upstream transmission from ONU to the OLT in the WDM/TDM-PON system is described next. The ONU2-1-1 through 2-1-$n$ send an upstream optical signal for wavelength $\lambda U1$, at the time specified by the OLT. Optical signals from each ONU are input by way of the wavelength division multiplexing coupler 5 and the optical splitter 3-1 as time-divided multiplexed wavelength $\lambda U1$ optical signals to the OLT1. The ONU2-2-1 through 2-2-$n$ send an upstream optical signal for wavelength $\lambda U2$ at the time specified by the OLT. The optical signals from each ONU are input by way of the wavelength division multiplexing coupler 5 and the optical splitter 3-2, as time-divided multiplexed wavelength $\lambda U2$ optical signals to the OLT1. The ONU2-3-1 through 2-3-$n$ send an upstream optical signal for wavelength $\lambda U3$ at the time specified by the OLT1. The optical signals from each ONU are input by way of the wavelength division multiplexing coupler 5 and the optical splitter 3-3, as time-divided multiplexed wavelength $\lambda U3$ optical signals to the OLT1. The ONU2-4-1 through 2-4-$n$ send an upstream optical signal for wavelength $\lambda U4$ at the time specified by the OLT1. The optical signals from each ONU are input by way of the wavelength division multiplexing coupler 5 and the optical splitter 3-4, as time-divided wavelength $\lambda U4$ optical signals to the OLT1. Therefore, optical signals for each of the time-divided multiplexed wavelength $\lambda U1$-$\lambda U4$ optical signals are input into the OLT1.

By bunching the plural wavelengths of the TDM-PON of the related art in this WDM/TDM-PON system, one OLT unit is capable of accommodating many ONU, making this WDM/TDM-PON system a potential candidate for next-generation PON since this WDM/TDM-PON achieves a larger transfer capacity.

[ONU Configuration for WDM/TDM-PON System]

Figure 4:
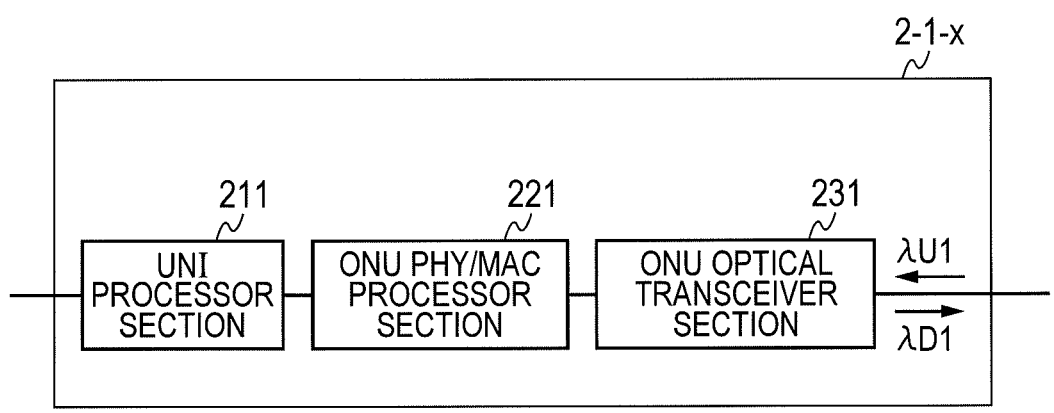
FIG. 4 is block diagram of the configuration example of the ONU (for upstream wavelength of λU1 and downstream wavelength of λD2)

An ONU configuration utilized in this WDM/TDM-PON is described while referring to FIG. 4. The ONU shown in FIG. 4 handles the downstream wavelength $\lambda D1$ and the upstream wavelength $\lambda U1$.

The ONU is comprised of a UNI (User Network Interface) processor section 211, an ONU PHY/MAC processor section 221, and an ONU optical transceiver section 231.

The ONU optical transceiver section 231 converts the optical signal for wavelength $\lambda U1$ that was input from the optical fiber to an electrical current signal, and further converts that electrical current signal to an amplified voltage signal and inputs that amplified voltage signal (as an electrical signal) to the ONU PHY/MAC processor section 221. The ONU optical transceiver section 231 also converts the electrical signal input from the ONU PHY/MAC processor section 221 to an optical signal for wavelength $\lambda U1$ and outputs that optical signal from the optical fiber.

The ONU PHY/MAC processor section 221 extracts the clock from the electrical signal that was input from the ONU optical transceiver section 231, retimes the voltage signal by utilizing the extracted clock, and converts that voltage signal to a digital signal. The ONU PHY/MAC processor section 221 also decodes the digital signal and extracts the frame, and identifies the user data and the control signal from the extracted frame and sends the data to the UNI processor section 211. The ONU PHY/MAC processor section 221 converts that data into frames utilizable in the PON zone based on the signal input from the UNI processor section 211, and outputs the frame to the ONU optical transceiver section 231.

The UNI processor section 211 sends the data signals received from the terminal to the ONU PHY/MAC processor section 221. The data signal received from the ONU PHY/MAC processor section 221 is converted into a signal matching the user network interface and sent.

The wavelengths covered in the description here assume use of a stationary ONU optical transceiver section, however a wavelength variable laser that dynamically changes the wavelength may for example be utilized.

[OLT Configuration of the First Embodiment of the Present Invention]

Figure 6:
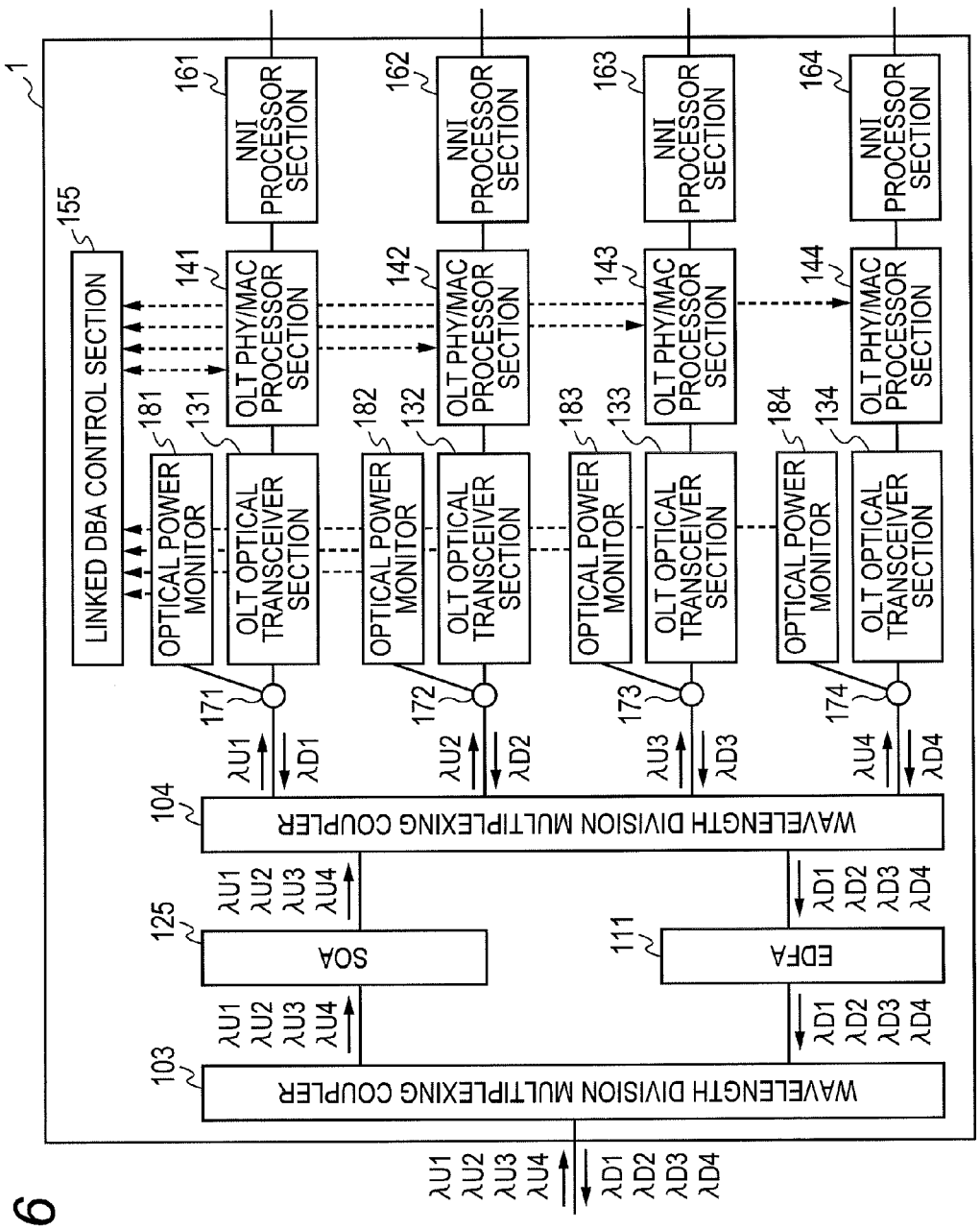
FIG. 6 is block diagram of the OLT configuration of the first embodiment of the present invention.

The configuration of the OLT in the first embodiment of the present invention is described while referring to FIG. 6. The OLT is comprised of a wavelength division multiplexing coupler 103, an EDFA111, an SOA125, a wavelength division multiplexing coupler 104, the OLT optical transceiver sections 131-134, an OLT PHY/MAC processor section 141-144, a linked DBA control section 155, a NNI processor section 161-164, the optical splitters 171-174, and the optical power monitors 181-184. Each of the above components is described next. The description here utilizes SOA and EDFA as examples of the optical amplifier but the present invention is not limited to these optical amplifiers.

The wavelength division multiplexing coupler 103 divides and multiplexes the downstream optical signals for wavelengths $\lambda D1$-$\lambda D4$ and the upstream optical signals for wavelengths $\lambda U1$-$\lambda U4$. The wavelength division multiplexing coupler 103 outputs the upstream wavelength multiplexed signal SOA125 for wavelengths $\lambda U1$-$\lambda U4$ input to the OLT to the SOA125. Moreover, the wavelength division multiplexing coupler 103 multiplexes the optical signals for wavelengths λD1-λD4 input from the EDFA111 and outputs these signals from the OLT.

The EDFA11 optically amplifies the optical signals for wavelengths λD1-λD4 input from the wavelength division multiplexing coupler 104 and outputs these amplified optical signals to the wavelength division multiplexing coupler 103.

The SOA125 optically amplifies the optical wavelength multiplexed signals for wavelengths λU1-λU4 input from the wavelength division multiplexing coupler 103, and outputs the amplified optical signals to the wavelength division multiplexing coupler 104.

The wavelength division multiplexing coupler 104 demultiplexer the optical wavelength multiplexed signals for the wavelengths λU1-λU4 that were input from the SOA125 and sends the respective demultiplexed signals to the optical splitter 171-174. The wavelength division multiplexing coupler 104 also multiplexes the optical signals for wavelengths λD1-λD4 respectively input from the optical splitters 171-174, and outputs the multiplexed signals to the EDFA111.

The optical splitters 171-174 respectively outputs a portion of the optical signals input from the wavelength division multiplexing coupler 104 to the respective optical power monitors 181-184, and outputs the remaining optical signals to the respective OLT optical transceiver sections 131-134. Almost all of the optical signals input from the OLT optical transceiver sections 131-134 are output to the wavelength division multiplexing coupler 104. Preferably as few as possible of the optical signals input from the OLT optical transceiver sections 131-134 are output to the optical power monitors 181-184.

The OLT optical transceiver sections 131-134 receives the upstream optical signals for the wavelengths λU1-λU4 that were input from the respective optical splitters 171-174, converts these optical signals to electrical currents signals, and further converts these electrical current signals to amplified voltage signals and respectively outputs these signals to the OLT PHY/MAC processor sections 141-144. Moreover, these electrical signals that were input from the OLT PHY/MAC processor sections 141-144 are converted to optical signals for the respective wavelengths λD1-λD4, and output respectively to the optical splitters 171-174.

The OLT PHY/MAC processor sections 141-144 extract the clocks from the electrical signals input from the respective OLT optical transceiver sections 131-134, retime the electrical signals by utilizing the extracted clocks, and convert these electrical signals to digital signals. The OLT PHY/MAC processor sections 141-144 moreover decodes these digital signals and extracts the frames. The control signals and user data are identified in the extracted frames, and the data is sent to the respective NNI processor sections 161-164. Moreover, the received control signals are analyzed, and the requested bandwidth amount from each ONU extracted from the control signals are output to the linked DBA control section 155. Control signals to send to the ONU are also generated based on the bandwidth allocation information output from the linked DBA control section 155.

The linked DBA control section 155 sets the bandwidth allocation information for each ONU based on the ONU power management table held by the linked DBA control section 155, and the requested bandwidth amount from each ONU input from the OLT PHY/MAC processor sections 141-144. The linked DBA control section 155 then outputs this information to the OLT PHY/MAC processor sections 141-144. Moreover, the linked DBA control section 155 registers the corresponding ONU-ID and ONU optical power information in the ONU power management table based on the ONU optical power information received from the optical power monitors 181-184 during ONU registration.

The NNI processor sections 161-164 convert the frames input from the OLT PHY/MAC processor sections 141-144 into signals matching the NNI interface and outputs these signals to the network.

The optical power monitors 181-184 receive the upstream optical signals for wavelengths λU1-λU4 input from respective optical splitters 171-174, and converts these optical signals into electrical signals at a voltage corresponding to the optical power of the optical signal. Moreover the optical power monitors 181-184 convert the electrical signals from analog to digital, and output the ONU optical power information as converted digital signals to the linked DBA control section 155. The ONU optical power information is for example the three values High, Middle, Low in order of power intensity.

In the present invention configured as described above, the linked DBA control section 155 is capable of setting the bandwidth allocation information for each ONU based on the requested bandwidth amount from each ONU at the input power and each wavelength from each ONU. The present invention is therefore capable of linked DBA control among a plurality of wavelengths.

[ONU Power Management Table Controlled by Linked DBA Control Section 155 in the Present Invention]

The ONU power management table controlled by the linked DBA control section is described next. FIG. 7 shows an example of the ONU power management table retained in the OLT in the present invention. The ONU-ID expressing the wavelength identifier λU and the ONU identifier, the power P_soa_in input to the SOA, and the value P_s of the input power group are retained in this table. The input power group are set as the three values P_Low, P_Middle, P_High found by comparing the input power with two threshold values P_th1, P_th2. When P_soa_in≤R_th1, then P_s=P_Low; when P_th1<P_soa_in<P_th2, then P_s=P_Middle, when P_soa_in≥th2 then P_s=P_High. For example when P_th1=−30 dBm, and P_th2=−22 dBm then the optical power of the optical signal input to the SOA is P_Low if −30 dBm or less, is P_High if −22 dBMm or more, and is P_Middle in all other cases.

The SOA input power for example corresponding to λU=1, ONU-ID=1, is a P_soa_i=−30 dBm, and the P_s=Low. An SOA input power corresponding to λU=2, ONU-ID=2, is a P_soa_in=−13 dBm, and the P_s=High. Further, an SOA input power corresponding to λU=3, ONU-ID=4, is P_soa_in = 25 dBm, and the P_s=Middle.

If using only P_s instead of P_soa_in for linked DBA control then the P_soa_in information need not be retained.

[Linked DBA Control Operation in the First Embodiment of the Present Invention]

The linked DBA control operation in the first embodiment of the present invention is described next. The bandwidth allocation cycles for DBA control on each wavelength utilize identical settings. In the linked DBA control section of the first embodiment, the total input power that is input to the SOA on each wavelength is replaced in the sequence of bandwidth allocations to each ONU so that the total input power is within a specified value.

[Flowchart Showing the Linked DBA Control Section Operation in the First Embodiment of the Present Invention]

Figure 8:
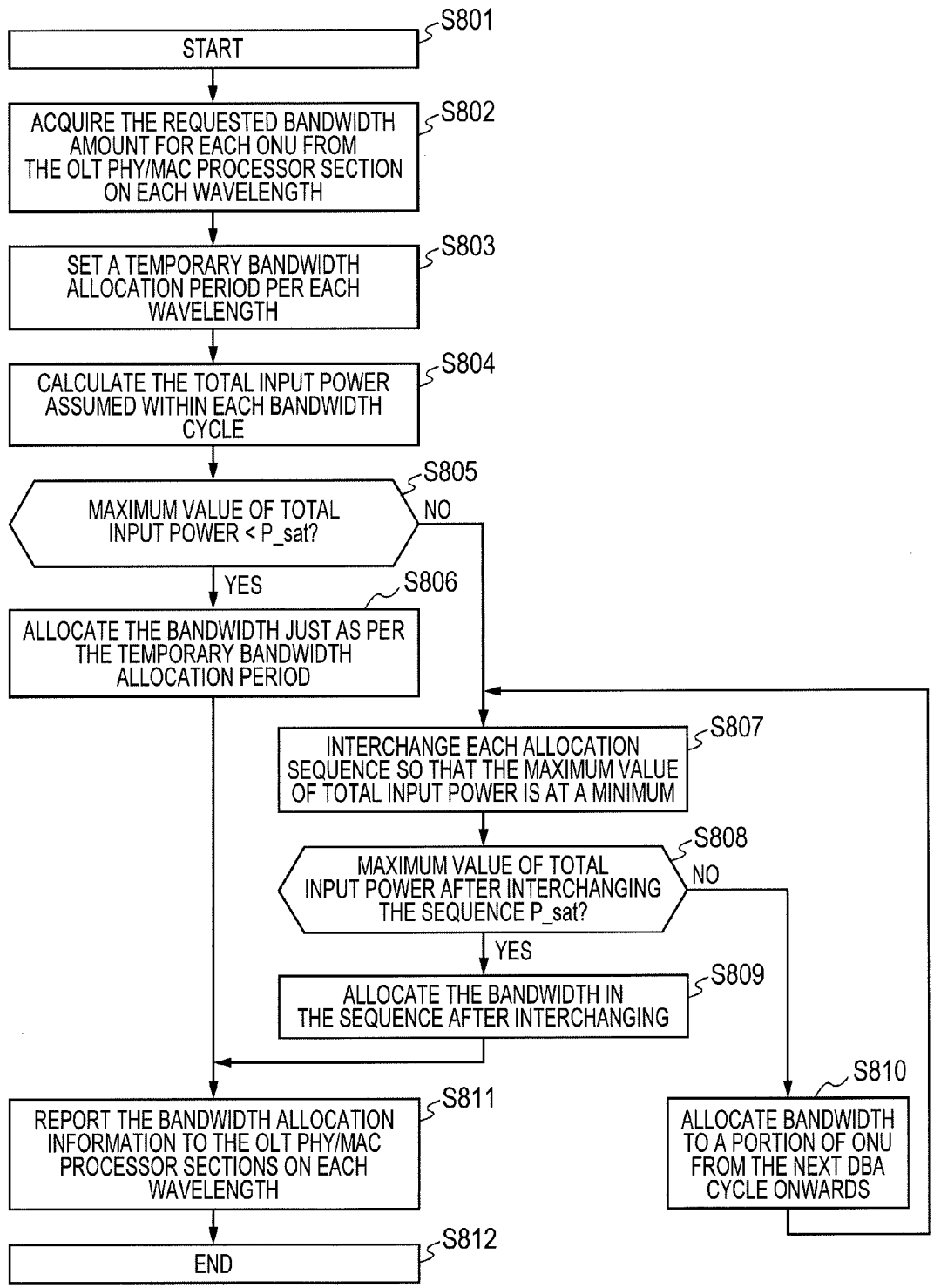
FIG. 8 is a flowchart showing the operation during normal transfer in the linked DBA control section in the first embodiment of the present invention.

The linked DBA control section operation is described utilizing the flowchart in FIG. 8. The operation in each step is described.

The linked DBA control operation starts in S801 and then shifts to S802.

In S802, the linked DBA control section acquire the requested bandwidth amount for each ONU from the OLT PHY/MAC processor section on each wavelength, and the process proceeds to S803.

In S803, the linked DBA control section sets the temporary bandwidth allocation period within the bandwidth allocation cycles of each ONU on all the wavelengths. These temporary bandwidth allocation period are assigned based on the requested bandwidth amount of each ONU within the same wavelength in the same way as DBA control in the related art. Any type of algorithm may be utilized to set the bandwidth allocation period in the ONU on each wavelength. After setting a temporary bandwidth allocation period in each ONU within the bandwidth allocation cycle, the process proceeds to S804.

In S804, the linked DBA control section calculates the estimated total input power P_total at each period within the DBA control bandwidth allocation cycle. Here, the total input power P_total is the total input power value from a plurality of wavelengths (input power of the wavelength-multiplexed optical signals), and in which each period is time-divided into the bandwidth allocation periods. The total input power value is calculated by referring to the ONU power management table. The linked DBA control section refers to the ONU power management table to find the SOA input power corresponding to the ONU identifier for each ONU that was temporarily set in S803, and calculates the total input power in each period based on what was set for allocation to which ONU identifier in each period. After calculating the total input power value in each period, the operation shifts to S805.

Next, in S805, the linked DBA control section calculates the maximum value P_total_max which is the maximum value for the total input power P_total within the bandwidth allocation period. The linked DBA control section compares the calculated maximum value P_total_max with the threshold P_sat, and when the P_total_max is less than P_sat, shifts the process to S806. In all other cases the process is shifted to S807.

In S806, the linked DBA control section sets the temporarily set bandwidth allocation period within the bandwidth allocation cycle for each ONU, unchanged as the bandwidth allocation period in each ONU. After deciding the bandwidth allocation period in each ONU, the operation shifts to S811.

In S807, the linked DBA control section calculates the allocation sequence of each ONU within the bandwidth allocation cycle so that the maximum value P_total_max for the total input power reaches a minimum. The method for calculating the allocation sequence for each ONU is described later on. The maximum value for the total input power after interchanging the sequence is set as P_sw_total_max. After completing the calculation, the process is shifted to S808.

In S808, the calculated P_sw_total_max is compared with the threshold value P_sat. If the P_sw_total_max is less than the P_sat then the operation shifts to S809. In all other cases the operation shifts to S810.

In S809, the linked DBA control section allocates bandwidth according to the bandwidth allocation period within the bandwidth allocation cycle after interchanging the bandwidth allocation sequence. After completing the allocation, the operation shifts to S811.

In S810, the linked DBA control section allocates bandwidth to a portion of the ONU according to the bandwidth allocation cycle from the next cycle onwards. The ONU scheduled for allocation from the next bandwidth allocation cycle onwards are excluded from the bandwidth allocation calculation and the process is returned to S807.

In S811, The linked DBA control section outputs the previously set bandwidth allocation period within the bandwidth allocation cycle for each ONU to the OLT PHY/MAC processor sections. After finishing the report, the process is shifted to S812, and the linked DBA control operation finishes.

By performing the above described operations, the linked DBA control section sets the bandwidth allocation period within the bandwidth allocation cycle for each ONU just as was temporarily set, when the SOA total input power was within the threshold value, and interchanges the allocation sequence to each ONU within the bandwidth allocation cycle so that an SOA input power will be within a threshold value in the event it was larger than the threshold. Moreover in the rare event that the SOA input power fails to fall within the threshold value even if the sequence was interchanged then the linked DBA control section performs bandwidth allocation to a portion of the ONU from the next bandwidth allocation cycle onwards, and then re-executes the sequence interchange so as to fall within the threshold value. The linked DBA control in the first embodiment of the present invention is therefore capable of constantly maintaining the total input power to the SOA within the threshold value.

[Method for Calculating ONU Allocation Sequence]

A method for calculating the bandwidth allocation sequence to the ONU so that the maximum value P_total_max of the total input power attains a minimum value within the bandwidth allocation cycle is described next. An ONU bandwidth allocation sequence that minimizes the P_total_max can be obtained for example by calculating and comparing the P_total_max of all ONU sequences on each wavelength but this method requires a long calculation time and so is not practical. So in order to further simplify the calculation, control may be implemented that minimizes the number of overlapping wavelengths where the ONU attains P_s=P_High by utilizing the power group values in the ONU power management table.

The present invention has the object of lowering the P_total_max after interchanging the bandwidth allocation sequence so that P_total_max is kept below the saturation level as much as possible, and so setting the P_total_max to a minimum is not always necessary.

For example, in cases where allocating an bandwidth allocation period on a wavelength 2 to an ONU where the P_s is P_High; in the period where a bandwidth allocation period was allocated on a wavelength 1 to an ONU where the P_s is P_Low, then allocating bandwidth after making as many ONU pairs with a P_s of P_High and P_Low as possible will reduce the number of overlapping bandwidth allocation period to an ONU where the P_s of the P_High.

Other methods include positioning the bandwidth allocation periods for each ONU within the bandwidth allocation cycle so that the P_s on the DBA bandwidth allocation cycles on a wavelength 1 and a wavelength 2 are from the beginning in the sequence of P_Low, P_Middle, P_High; and positioning the bandwidth allocation periods for each ONU within the bandwidth allocation cycle so that the P_s on a wavelength 3, and a wavelength 4 are in the sequence of P_High, P_Middle, P_Low to in this way reduce the number of overlapping bandwidth allocation periods for ONU where the P_s=P_High.

[Method for Setting the Threshold Value P_sat]

The method for setting the threshold value P_sat is described next. The gain of the SOA is set to G_soa. The P_sat×G_soa for example may be set below the saturation output level of the SOA. In this case, the maximum value of the SOA output power attains P_total×G_soa; and this value is the SOA saturation output level. This saturation output level is at most a general guide, and the deterioration due to saturation is not zero. The saturation output level may therefore be set to an even lower level if preventing deterioration to an even further degree is preferred.

[Example of Upstream Optical Signal in the First Embodiment of the Present Invention]

The operation to make the total input power of the optical signal input to the SOA reach a specified value or lower by the linked DBA control operation in the first embodiment of the present invention is described next while referring to FIG. 9.

Figure 5:
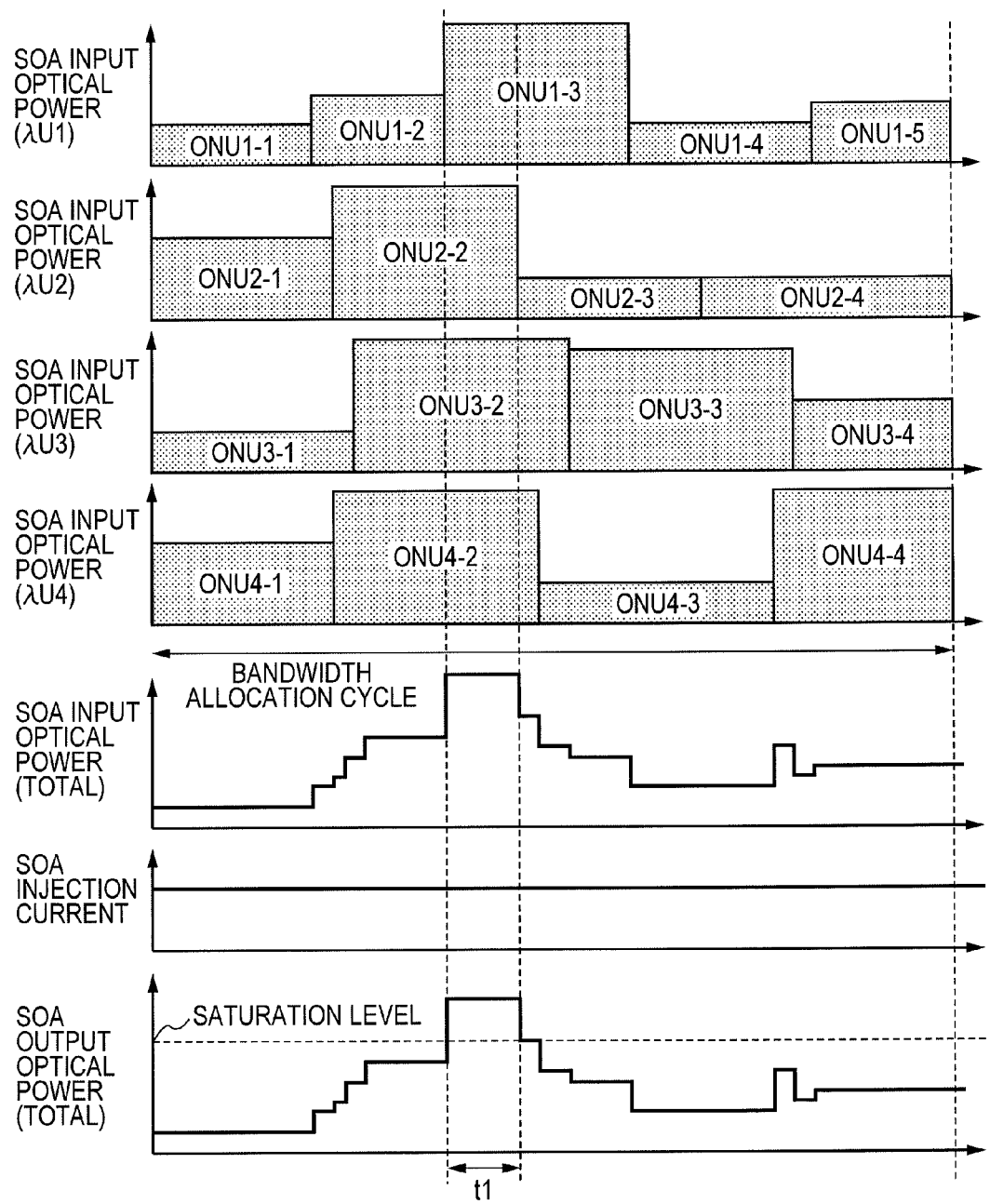
FIG. 5 is a chart showing one example of the upstream optical signal of the related art.
Figure 9:
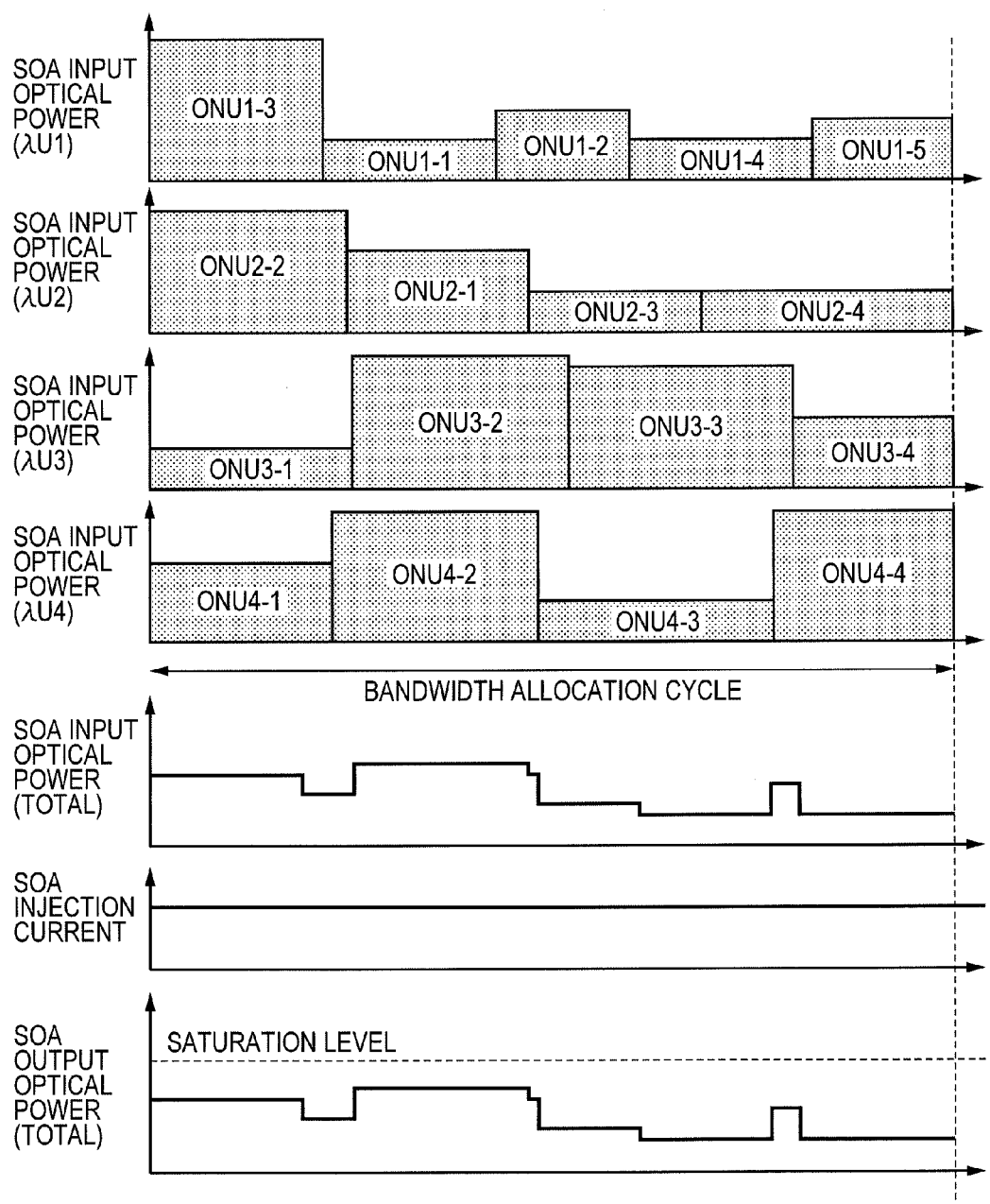
FIG. 9 is an example of the upstream optical signal during linked DBA control in the first embodiment of the present invention.

FIG. 9 is a table showing the optical power on each wavelength input to the SOA, the total optical power input to the SOA, the SOA injection current, and also showing the time transition of the total optical power output from the SOA when utilizing the OLT configuration of the present application in FIG. 5. In the first embodiment of the present invention the bandwidth allocation sequence for each ONU within the bandwidth allocation cycle is interchanged so as to reduce the total optical power input to the SOA. More specifically, in the ONU group at wavelength λU1, at a temporary setting of ONU1-1, ONU1-2, ONU1-3, ONU1-4, and ONU1-5; the bandwidth allocation sequence is interchanged so that bandwidth allocation period is allocated in the sequence of ONU1-3, ONU1-1, ONU1-2, ONU1-4, and ONU1-5.

In the cases where the bandwidth allocation sequence was interchanged as shown above, one can see that the total SOA input optical power is suppressed to a smaller value compared to the total SOA input optical power in FIG. 5 utilizing the OLT configuration of the related art. The SOA injection current in the first embodiment is a fixed value and therefore the total SOA optical output power can also be suppressed to a smaller value compared to the related art and suppressed to a value below the saturation level. Therefore, no saturation will occur in the SOA and there is no deterioration in the waveform.

[Operation Between OLT and ONU in the Present Invention]

Figure 10:
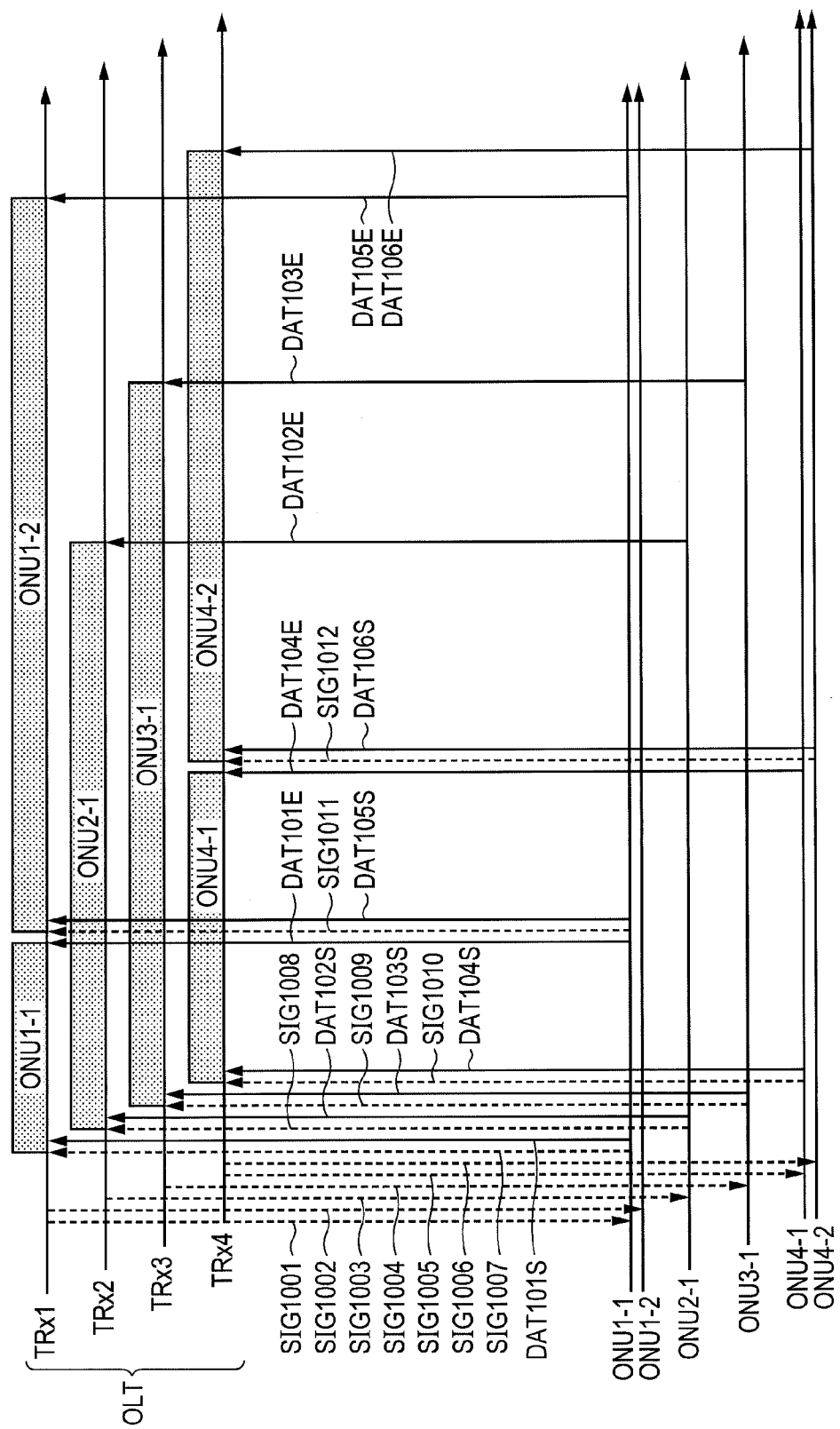
FIG. 10 is a sequence drawing showing the operation between the ONU and the OLT in the present invention.

The operation between OLT and ONU in the present invention is described while referring to FIG. 10. To simplify the description, six coupled ONU are utilized and are the ONU1-1, ONU1-2, ONU2-1, ONU3-1, ONU4-1, and ONU4-2.

First of all, the OLT sends gate frame (SIG1001, SIG1002, SIG1003, SIG1004, SIG1005, and SIG1006) for all the ONU from the optical transceivers TRx1, TRx2, TRx3, and TRx4. Next the ONU receiving the gate frames, send report frames and upstream data at the time specified in the gate frame. After sending the report frame (SIG1007), the ONU1-1 sends the data (from DAT101S to DAT101E). The ONU2-1 sends the data (from DAT102S to DAT102E) after sending the report frame (SIG1008). The ONU3-1 sends the data (from DAT103S to DAT103E) after sending the report frame (SIG1009). The ONU4-1 sends the data (from DAT104S to DAT104E) after sending the report frame (SIG1010). The ONU1-2 sends the data (from DAT105S to DAT105E) after sending the report frame (SIG1011). The ONU4-2 sends the data (from DAT106S to DAT106E) after sending the report frame (SIG1012).

The method for utilizing the report frame by which the ONU notifies the OLT of the requested bandwidth amount, and the gate frame by which the OLT specifies the bandwidth allocation period within the bandwidth allocation cycle to the ONU is described here. The configuration of each field in the report frame and the gate frame utilizes the structure as specified in IEEE802.3av Clause 77.3.6.

The report frame includes the "QUEUE#0REPORT" through the "QUEUE#7REPORT" fields that show the requested bandwidth amount. In the present invention, the requested bandwidth amount is entered in the "QUEUE#0REPORT" field.

The gate frame includes the transmit bandwidth that the OLT allocates to each ONU or in other words includes fields for the "GRANT#1StartTime" [GRANT#1Length]– "GRANT#4StartTime" [GRANT#4Length] that express the applicable bandwidth allocation period of each ONU within the bandwidth allocation cycle. In the present invention, the "GRANT#1StartTime" [GRANT#1Length] are used to specify the bandwidth allocation period within the bandwidth allocation cycle.

A plurality of bandwidth allocation periods and requested bandwidth amounts may be utilized in each service or priority order.

Therefore upstream communication can be achieved in the bandwidth allocation period synchronized on each wavelength, by adjusting the gate frame timing on each wavelength that the OLT transmits to the ONU.

[Flowchart Showing the Operation During Discovery in the Linked DBA Control Section in the First Embodiment of the Present Invention]

Figure 11:
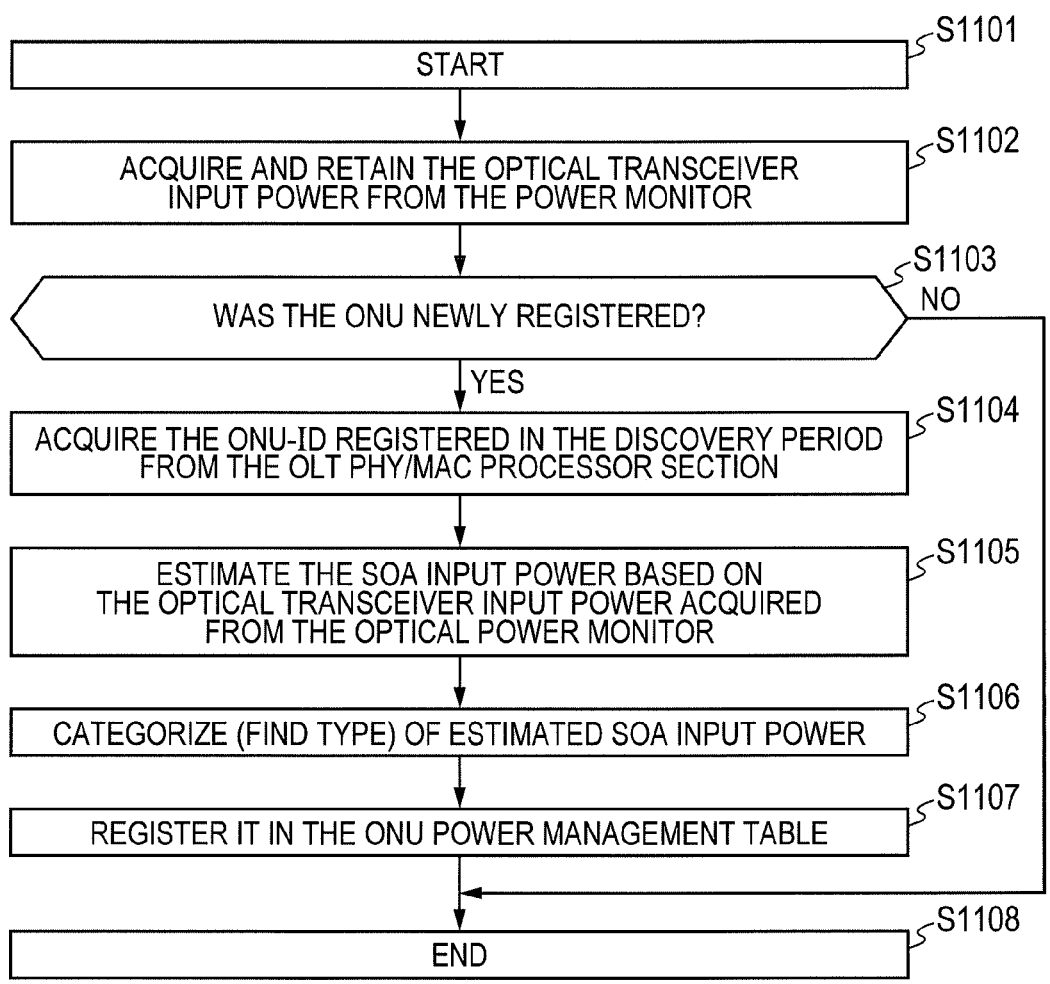
FIG. 11 is a flowchart showing the operation during discovery in the linked DBA control section of the first embodiment of the present invention.

A flowchart showing the operation during discovery in the linked DBA control section in the first embodiment of the present invention is described utilizing FIG. 11. The operation is described according to each step.

In S1101, the discovery operation in the linked DBA control section starts and the operation shifts to S1102.

In S1102, the linked DBA control section acquires the optical power that the optical power monitor input to the OLT optical transceiver section, and the operation shifts to S1103.

In S1103, the linked DBA control section confirms whether or not an ONU was newly registered in the OLT PHY/MAC processor section during the discovery period. In the event an ONU was newly registered during the discovery period then the operation shifts to S1104 and if not registered the operation shifts to S1108.

In S1104, the linked DBA control section acquires the ONU-ID registered by the OLT PHY/MAC processor section during the discovery period. After acquiring the ONU-ID, the operation shifts to S1105.

In S1105, the linked DBA control section estimates the SOA input power based on the input optical power of the OLT optical transceiver section acquired from the optical power monitor in S1102. More specifically, the linked DBA control section calculates the SOA gain from the wavelength of the optical signal and the injection current set in the SOA, and estimates a value reduced by an amount equivalent just to the calculated SOA gain as the SOA input power. In the first embodiment, the injection current is a fixed value and if a region where the SOA gain is not very dependent on the wavelength then the gain is also a fixed value so that calculation is simple. After completing calculation of the SOA gain the operation shifts to S1106.

In S1106, the linked DBA control section compares the SOA input power estimated in S1105 with a threshold value and sets the input power type to Low, Middle, or high. After the setting the operation shifts to S1107.

In S1107, the linked DBA control section registers the wavelength identifier λU, ONU-ID, the input power P_soa_in, and the input power type P_s that were input to the wavelength identifier λU into the ONU power management table.

Therefore, by executing from S1101 through S1108, the linked DBA control section can register the wavelength identifier λU, ONU-ID, the power P_soa_in, and the input power type P_s input to the wavelength identifier λU, into the ONU power management table just at times when an ONU was newly registered during the discovery period.

[Discovery Allocation Period and Normal Transfer Allocation Period in the First Embodiment of the Present Invention]

The allocation methods in the "discovery allocation period" and "normal allocation period" of the first embodiment of the present invention are described next. The "discovery allocation period" is the period that the ONU newly coupled to the OLT sends a reply signal (discovery response signal) for the optical signal (discovery signal) that the OLT sent in order to register the newly coupled ONU. The "normal transfer allocation period" is the period that information that should be sent to the ONU or information other than control information for registering newly coupled ONU is sent.

During the discovery allocation period, the OLT might possibly receive optical signals from ONU at an unspecified distance from the applicable OLT or namely from an ONU of unspecified input power. The linked DBA control therefore cannot set the total input power to within a specified value as described in normal transfer allocation period. A period where the discovery allocation period implemented using an optical signal on a certain wavelength and a normal transfer allocation period for receiving optical signals on other wavelengths overlap each other therefore occurs and the total input power cannot fall within a specified value and normal transfer cannot be correctly achieved during this period.

This situation requires considering the allocations of the "discovery allocation period" and "normal transfer allocation period". Allocation methods includes a method (1) that sets the total input power in the discovery allocation periods within a specified value by an optical signal on a certain wavelength; and a method (2) that prevent effects on the operation during normal transfer by setting the discovery allocation periods to an identical period by optical signals on all wavelengths. During the normal transfer allocation period, the linked DBA control section described above allocates the bandwidth to each ONU.

[Allocation Method 1 for the Discovery Allocation Period and Normal Transfer Allocation Period in the First Embodiment of the Present Invention]

Figure 12:
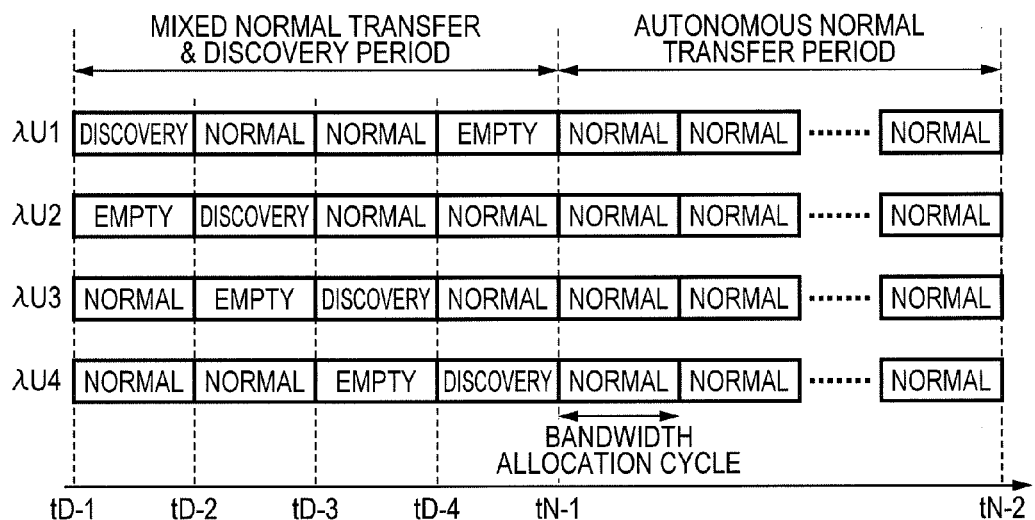
FIG. 12 is a first allocation method for the discovery allocation period and the normal transfer allocation period in the present invention.

First of all, the method (1) is described. Method (1) groups allocation periods into a mixed normal transfer and discovery period that implements discovery on any of the wavelengths; and an autonomous normal transfer period that performs normal transfer on all wavelengths. These mixed normal transfer and discovery period and autonomous normal transfer period are alternately allocated. The method (1) may for example repeatedly allocate bandwidth only on a mixed normal transfer and discovery period of 4 ms, and only on an autonomous normal transfer period of 996 ms. The method (1) is hereafter described while referring to FIG. 12.

The mixed normal transfer and discovery period (tD-1 through tN-1) may be any of a discovery allocation period (DISCOVERY), a normal allocation period (NORMAL), and an empty allocation period (EMPTY). More specifically, on the wavelength $\lambda U1$ allocation is performed in the sequence of Discovery, Normal, Normal, and Empty. On the wavelength $\lambda U2$, allocation is performed in the sequence of Empty, Discovery, Normal, and Normal. On the wavelength $\lambda U3$, allocation is performed in the sequence of Normal, Empty, Discovery, and Normal. On the wavelength $\lambda U4$, allocation is performed in the sequence of Normal, Normal, Empty, and Discovery.

In the autonomous normal transfer period (tN-1 through tN-2), upstream transmission on all wavelengths is only in Normal. Moreover, the Normal periods on all wavelengths are synchronized with each other.

In this example, Discovery was set for the 1 (one) wavelength, Empty for 1 (one) wavelength, and Normal for 2 (two) wavelengths. However, if lowering the total SOA input power is necessary then the number of wavelengths set for Empty may be increased.

The method (1) is therefore capable of suppressing the total SOA input power by providing a non-communication time period, and the mixed normal transfer and discovery period that execute discovery on any wavelength are capable of always setting the total input power within a specified value and without affecting normal transfer.

[Allocation Method 2 for the Discovery Allocation Period and Normal Transfer Allocation Period in the First Embodiment of the Present Invention]

Figure 13:
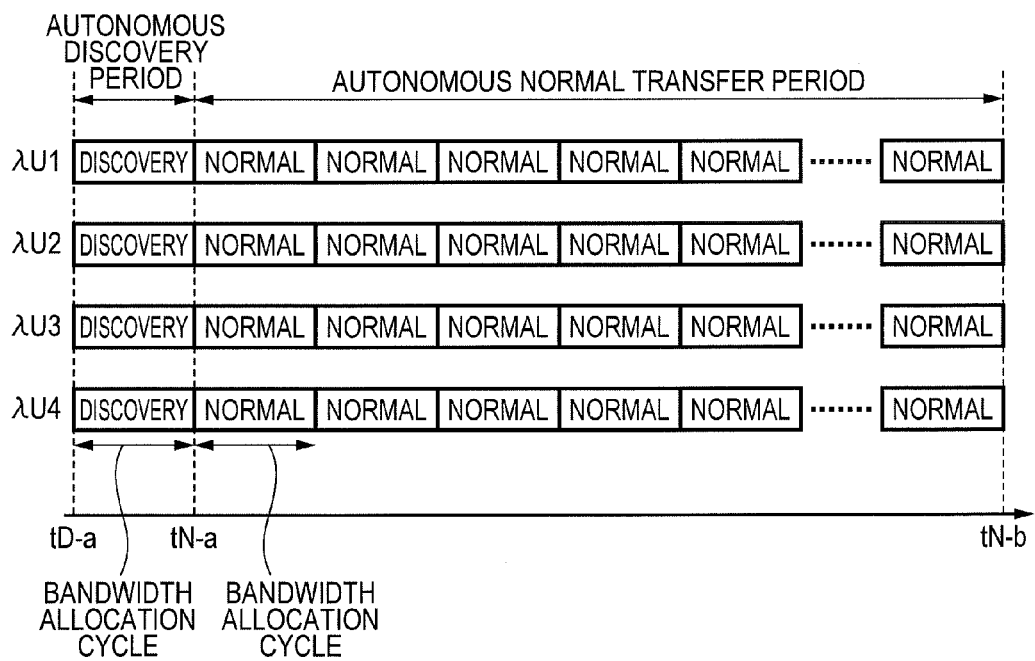
FIG. 13 is a second allocation method for the discovery allocation period and the normal transfer allocation period in the present invention.

The method (2) is described next. The method (2) groups allocation periods into an autonomous discovery period that implements discovery on all wavelengths; and an autonomous normal transfer period that implements normal transfer on all wavelengths. This autonomous discovery period and autonomous normal transfer period are alternately allocated. The autonomous discovery period for example is repeatedly allocated for just 1 ms, and the autonomous normal transfer period allocated for just 999 ms. The method (2) is hereafter described while referring to FIG. 13.

Discovery allocation periods (Discovery) are assigned on all wavelengths $\lambda U1$ through $\lambda U4$ in the autonomous discovery periods (tD-a through tN-a). The discovery operation is implemented simultaneously on a plurality of wavelengths so that the total SOA input power becomes large and correctly receiving the discovery reply signal might be impossible due to SOA saturation, discovery performed on all wavelengths might fail when the distance from the OLT is close, and a plurality of ONU are simultaneously sending discovery reply signals on different wavelengths. However, the possibility that this phenomenon will occur is extremely low and even if discovery fails, the discovery will succeed in a discovery allocation period from the next time onward and so is not considered a particular problem in the system. Moreover, in order to reduce the probability that this phenomenon will occur, the discovery allocation time or namely the autonomous discovery period may be allocated over a longer period on one wavelength compared to the period in the related art.

The method is identical to method (1) for the autonomous normal transfer period. The method (2) can therefore prevent adverse effects on normal transfer that occur due to simultaneously implementing discovery on different wavelengths.

[Effect Rendered by the First Embodiment of the Present Invention]

The effect rendered by the first embodiment of the present invention is described next. The present embodiment is capable of upstream transmission without saturating the optical amplifier even during joint use of optical amplifiers in OLT receivers on WDM/TDM-PON systems on a plurality of wavelengths. The first embodiment can therefore reduce the number of optical amplifiers for receiving upstream OLT communications and achieve low-cost and compact OLT during multi-branching and line extension in WDM/TDM-PON systems.

Second Embodiment

The first embodiment implemented linked DBA control so as to set the total optical power input to the SOA within a specified value by an SOA injection current at a fixed value. The second embodiment implements linked DBA control so that the input power from each wavelength are nearly the same value, and moreover regulates the injection current according to the total input power. Implementing this type of control allows increasing the injection current and increasing the gain when the input power of the optical signals on each wavelength are small, and lowers the injection current and reduces the gain when the input power of the optical signals on each wavelength are large.

Increasing the injection current when the total input power of the optical signals on each wavelength is small makes saturation less prone to occur; moreover decreasing the injection current when the total input power of the optical signals on each wavelength is large makes saturation difficult to occur and prevents deterioration in the waveform caused by saturation.

The description given here utilized an SOA as the optical amplifier, however the invention is not limited to those types of optical amplifiers and other optical amplifiers may be utilized if capable of regulating the gain. The SOA is capable of controlling the optical amplifier gain by regulating the injection current. EDFA or PDFA (optical fiber amplifier) is capable of controlling the optical amplifier gain by regulating the power of the pump light.

[OLT Configuration in the Second Embodiment of the Present Invention]

Figure 14:
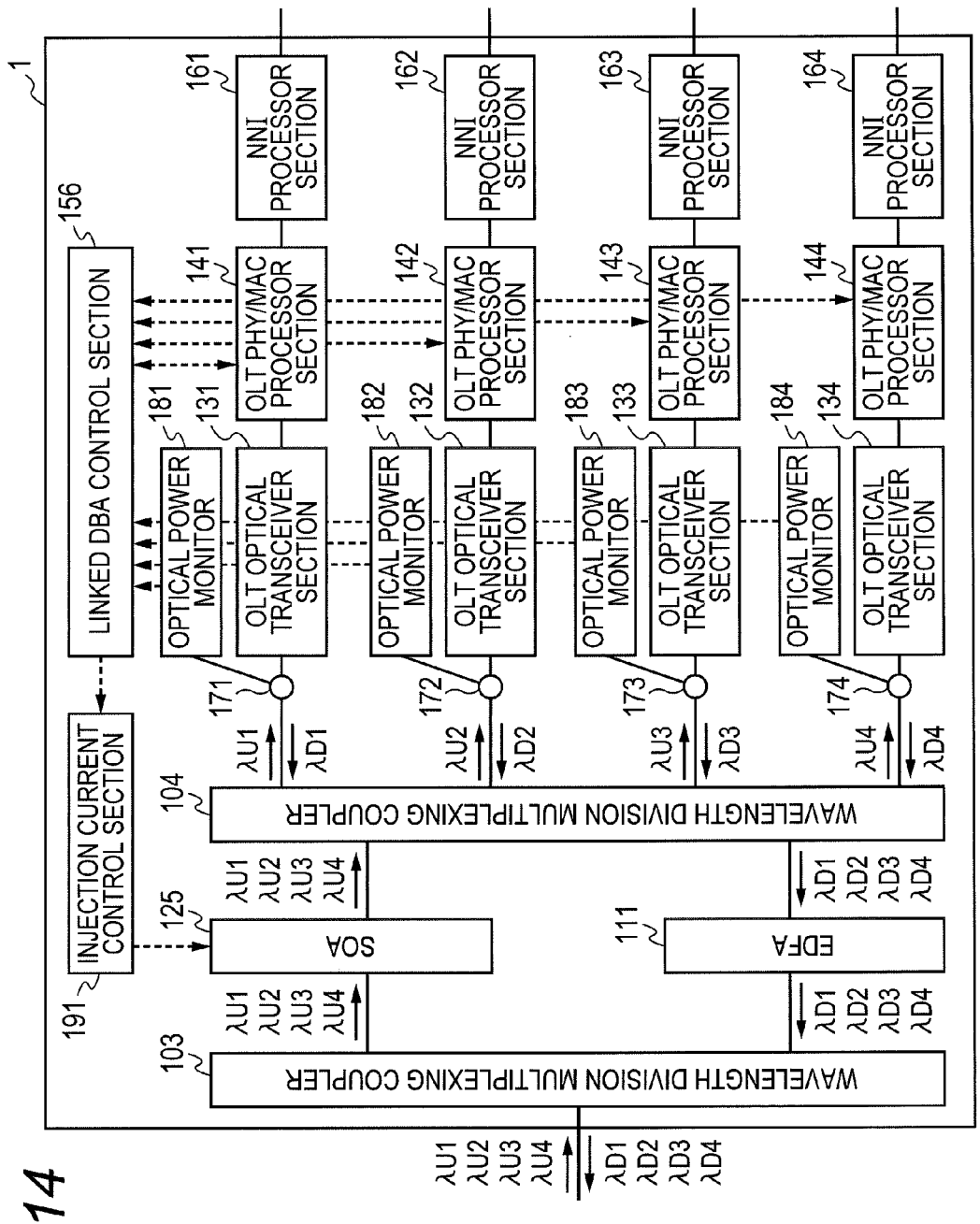
FIG. 14 is a block diagram of the OLT in the second embodiment of the present invention.

The OLT configuration of the second embodiment of the present invention is described next while utilizing FIG. 14. The description centers on the differences in the OLT configuration versus the first embodiment. Besides the wavelength division multiplexing coupler 103, an EDFA (Erbium-Doped Optical Fiber Amplifier) 111, a SOA (Semiconductor Optical Amplifier) 125, a wavelength division multiplexing coupler 104, the optical transceiver sections 131-134, the OLT PHY/MAC processor sections 141-144, a linked DBA control section 156, the NNI processor sections 161-164, the optical splitters 171-174, and the optical power monitors 181-184, the OLT is further comprised of an injection current control section 191.

The operation in the respective OLT optical transceiver sections 131-134, the OLT PHY/MAC processor sections 141-144, the NNI processor sections 161-164, and the optical power monitors 181-184 for a portion of the optical signals input from the wavelength division multiplexing coupler 103, the EDFA 111, the SOA 125, the optical splitters 171-174, and the wavelength division multiplexing coupler 104 is the same as in the first embodiment so the description is omitted.

The linked DBA control section 156 sets the bandwidth allocation information to each ONU based on the requested bandwidth amount from each ONU input by the OLT PHY/MAC processor sections 141-144 as well as the ONU power control table retained in the linked DBA control section 155 and also outputs the information to the OLT PHY/MAC processor sections 141-144. The linked DBA control section 156 registers (stores) the match between the ONU-ID and ONU optical power information in the ONU power management table based on the ONU optical power information received from the optical power monitors 181-184 during ONU registration.

The linked DBA control section 156 of the second embodiment moreover outputs the injection current information to the injection current control section 191 based on the bandwidth information that was set.

The injection current control section 191 regulates the amount of current injected into the SOA based on the injection current information that was input from the linked DBA control section 156. In the present embodiment, the injection current information is expressed as the two values High and Low. When the injection current information is high, the injection current quantity is set to I_high, and when the injection current information is Low, then the injection current quantity is set to I_Low. The method for deciding the values for the current quantity I_high and current quantity I_Low is described later on. Three values may also be utilized for the injection current information.

In the configuration of the present invention the linked DBA control section 156 is capable of setting the bandwidth allocation information to each ONU based on the requested bandwidth amount from each ONU at each wavelength and the input power from each ONU. Moreover the linked DBA control section 156 can regulate the injection current to the SOA based on the bandwidth allocation information that was set. The linked DBA control section 156 can therefore implement DBA control linked across plural wavelengths and can also dynamically regulate the injection current in each receive period.

The above description utilized an example that regulates the injection current to the SOA however other methods may be utilized if capable of regulating the gain of the optical amplifier. The linked DBA control section 156 may in other words output gain information to a gain regulator section equivalent to the injection current control unit 191 based on the bandwidth allocation information that was set, and that gain regulator section controls the gain of the optical amplifier based on the gain information that was input from the linked DBA control section 156.

[Method for Setting the Injection Current Quantities I_High and I_Low]

The method for setting the injection current quantities I_high, I_low is described here. The values for these injection current quantities are established based on the receivable optical power range (P_in_min through P_in_max) of the OLT established by the PON system; receivable optical power range of the transceiver (P_rx_min through P_rx_max); and the injection current dependence on the SOA gain. The I_high is set so that the optical power after optical amplification by the SOA will be larger than the minimum receivable optical sensitivity P_rx_min of the transceiver, so that the optical signal at a minimum receivable optical power P_in_min as established in the standards is receivable. The I_low is set so that the optical power after optical amplification by the SOA will be smaller than the maximum receivable optical sensitivity P_rx_max of the transceiver, so that the maximum receivable optical power as established in the standards can be received.

Consider the case for example where the P_in_min=−34 dBm, the P_in_max=−12 dBm, the P_rx_min=−28 dBm, and the P_rx_max=−6 dBm; with an SOA gain of 15 dB at an injection current of 200 mA, and an SOA gain of 3 dB at an injection current of 100 mA. In this case, if the I_high equals 200 mA, and the I_low equals 100 mA, then the optical power after optical amplification during receiving at the minimum receivable optical power will be −34+15=−19 dBm>P_rx_min; and the optical power after optical amplification during receiving of maximum receivable optical power will be −12+3=−9<P_rx_max.

[Linked DBA Control Operation in the Second Embodiment of the Present Invention]

The operation of the linked DBA control section in the second embodiment of the present invention is described next. The bandwidth allocation cycle during DBA control is the same setting on all wavelengths. In the linked DBA control section of the second embodiment, the bandwidth allocation sequence assigned to each ONU is interchanged so that the input power of the optical signals on each wavelength input to the SOA is as nearly the same as possible. In other words, bandwidth is allocated within the same wavelength so as to minimize the difference in optical power of the optical signals from each wavelength simultaneously input to the SOA.

[Flowchart Showing the Operation During Normal Transfer in the Linked DBA Control Section of the Second Embodiment of the Present Invention]

Figure 15:
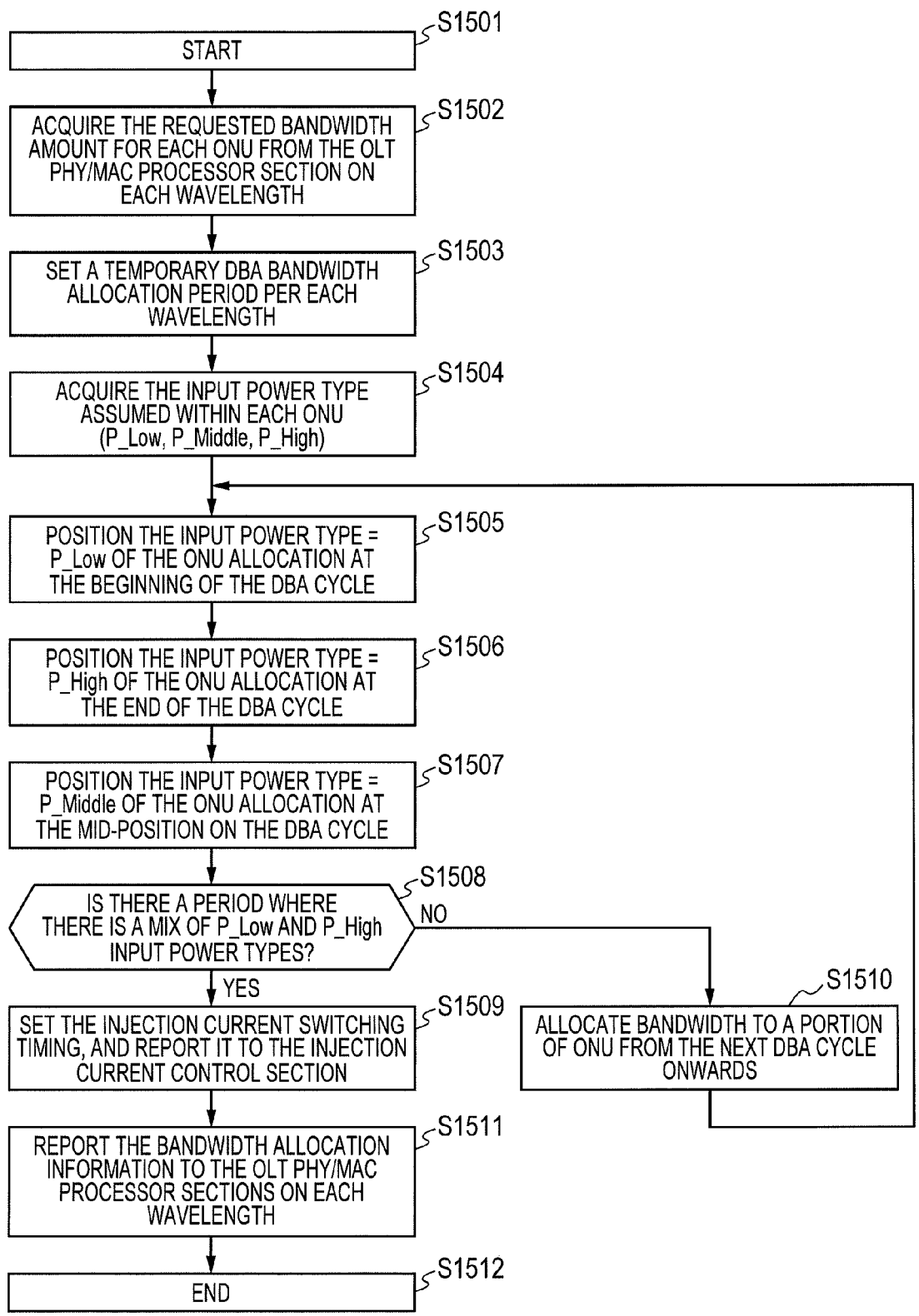
FIG. 15 is a flowchart showing the operation during normal transfer in the linked DBA control section of the second embodiment of the present invention.

The operation of the linked DBA control section of the second embodiment is described while referring to the flowchart in FIG. 15. The operation is described according to each step.

In S1501, the operation for normal transfer in the linked DBA control section starts and shifts to S1502.

In S1502, the linked DBA control section acquires the requested bandwidth amount from the OLT PHY/MAC processor sections for each wavelength, and the operation shifts to S1503.

In S1503, the linked DBA control section sets the temporary bandwidth allocation period for each ONU on each wavelength. In this temporary setting, the linked DBA control section sets the bandwidth allocation period for each ONU within the bandwidth allocation cycle based on the requested bandwidth amount for each ONU within the same wavelength the same as in the related art. After setting the bandwidth allocation period the operation shifts to S1504.

In S1504, the linked DBA control section acquires the input power type for each ONU temporarily set in the bandwidth allocation period, from the ONU power management table. The input power type here is values set in three types: P_Low, P_Middle, and P_High. Optical signals sent from an ONU whose input power type is grouped as P_Low are receivable when the gain level of the SOA is set to G_High (injection current is I_high). Optical signals sent from an ONU whose input power type is grouped as P_High are receivable when the gain level of the SOA is set to G_Low (injection current is I_Low). Moreover, the optical signals sent from an ONU whose input power type is grouped as P_Middle are receivable when the gain level of the SOA is set to either of the conditions G_High, G_Low. When the linked DBA control section acquires the input power type then the operation shifts to S1505. In the second embodiment, the threshold values P_th1, P_th2 for setting the input power type, serve to prevent SOA saturation and moreover are required for setting the optical power after optical amplification so as to fall within the receivable optical power range of the transceiver. The method for setting the threshold values P_th1, P_th2 is related later on.

In S1505, the linked DBA control section positions the bandwidth allocation period of ONU whose input power type is P_Low, at the beginning of the bandwidth allocation cycle. If there are plural ONU on each wavelength whose input power type is P_Low, then the positioning sequence among those ONU is not considered. After positioning, the operation proceeds to S1506.

In S1506, the linked DBA control section positions the bandwidth allocation (period) of ONU whose input power type is P_High at the end of the bandwidth allocation cycle. If there are the plural ONU on each wavelength whose input power type is P_High, then the positioning sequence among those ONU is not considered. After setting the positioning, the operation proceeds to S1507.

In S1507, the linked DBA control section allocates the bandwidth allocation (period) of ONU whose input power type is P_Middle, between the end time of bandwidth allocation period of ONU that are P_Low, to the start time of bandwidth allocation period of ONU whose input power type is P_High. The end time in bandwidth allocation period of P_low ONU may differ by wavelength from the start time in bandwidth allocation period of P_High ONU. After setting the positioning, the operation proceeds to S1508.

In S1508, the linked DBA control section analyzes the bandwidth allocation on each wavelength, and groups the bandwidth allocation periods into six regions of region A through region F. Regions only for bandwidth allocation periods of ONU whose input power type is Low are called region A; regions for input power types of ONU having a mix of P_Low and P_Middle bandwidth allocation periods are called region B; regions only for bandwidth allocation periods of ONU whose input power type is P_Middle are called region C; regions for input power types of ONU having a mix of P_Middle and P_High bandwidth allocation periods are called region D; regions only for bandwidth allocation periods of ONU whose input power type is P_High are called region E; and regions for input power types of ONU having a mix of P_Low and P_High bandwidth allocation periods are called region F. Due to the various ONU bandwidth allocation sequences within the bandwidth allocation cycle on each wavelength, the regions A through F might not always occur in each bandwidth allocation cycle.

After analysis, the linked DBA control section decides whether there is a region (region F) having a mix of P_Low and P_High input power types or not. If there is no region F then the operation proceeds to S1509. If there is a region F, then the operation proceeds to S1510.

In S1509, the linked DBA control section sets the injection current switching timing, and commands injection current switching in the injection current control unit. The switching timing for the injection current may for example be set as shown below.

If there is a region C within the bandwidth allocation cycle, then the linked DBA control section sets the injection current switching timing at the start time for region C or the end time of region C. If there is no region C within the bandwidth allocation period then the time switching from region A or region B to the region D or region E is set as the injection current switching timing. Setting the switching timing in this way ensures that the injection current does not switch during receiving of data.

After setting the injection current switching timing, the linked DBA control section commands the injection current control section to perform switching and the operation proceeds to S1511.

In S1510, the linked DBA control section allocates bandwidth to a portion of the ONU from the next bandwidth allocation cycle onwards, and removes those ONU from bandwidth allocation in the current bandwidth allocation cycle. This operation serves to allocate bandwidth to a portion of the ONU in the next bandwidth allocation cycle onwards even if implementing the positioning in S1505 through S1507, and even if Region F has occurred, and also maintains a period that allows switching the injection current even if region F has not occurred. After the linked DBA control section performs this allocation, the operation proceeds to S1505.

In S1511, the linked DBA control section notifies the OLT PHY/MAC processor sections on each wavelength of the bandwidth allocation information, the operation proceeds to S1512 and the normal transfer operation ends.

By performing the above operation, the linked DBA control section can lower the total input power of the SOA in the first-half of the DBA bandwidth allocation cycle, can set the SOA total input power in the intermediate region of the bandwidth allocation cycle to an intermediate value, and can increase the total input power for the SOA in the latter-half region of the bandwidth allocation cycle, and can switch the injection current within the intermediate region.

[Method for Setting the Thresholds P_th1, P_th2]

The method for setting the thresholds P_th1, P_th2 is described here. These thresholds are set so as to satisfy the following two conditions. A first condition is that when the input power on a certain wavelength is P_th1 through P_th2, then that receivable signal must be capable of receiving at either of the gains G_high, and G_low. Specifically, the threshold may be set so as to satisfy G_high× P_th2<P_rx_max and also G_low×P_th1>P_rx_min. A second condition is that when the input power on each wavelength is P_th1 through P_th2 with the SOA gain at G_high, then the SOA is set so as not to saturate. Stated more specifically, a setting may be made so that N×G_high×P_th2 is less than the saturation output level. Here, N denotes the wavelength multiplexing number and in this case is 4.

Consider the case for example where P_in_min=−34 dBm, P_in_max=−12 dBm, P_rx_min=−28 dBm, P_rx_max=−6 dBm; and the SOA gain is 15 dB at an injection current of 200 mA, the SOA gain is 3 dB at an injection current of 100 mA, and the SOA saturation output level is +7 dBm. In this case, the P_th1>−31 dBm, P_th2<−21 dBm from condition 1. Also, P_th2<−14 dBm from condition 2. Therefore the thresholds may be set so that P_th1=−30 dBm, P_th2=−22 dBm.

[Example of Upstream Optical Signal in the Second Embodiment of the Present Invention]

The operation by the linked DBA control of the second embodiment of the present invention to prevent saturation of the SOA is described next while referring to FIG. 16.

Figure 16:
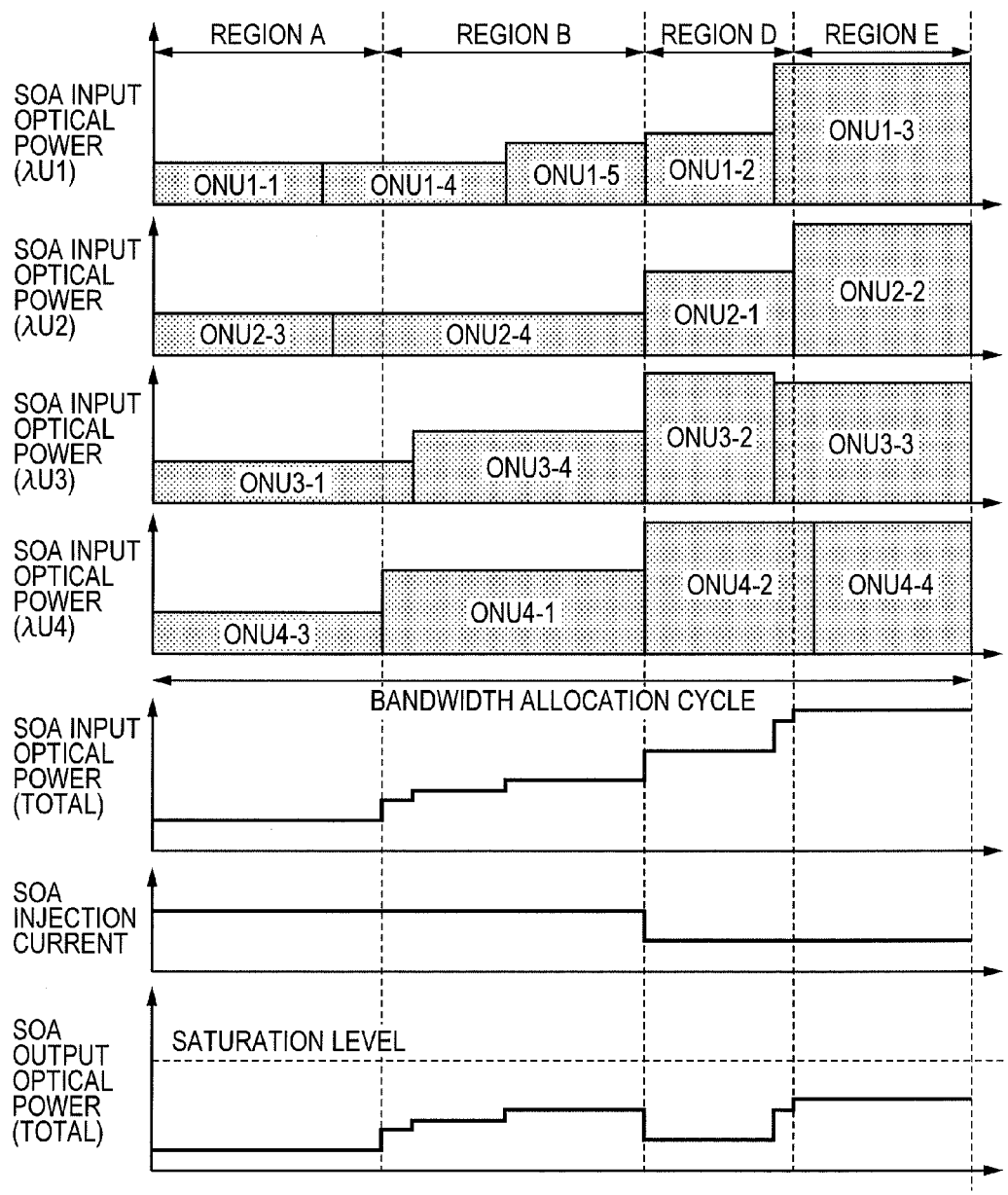
FIG. 16 is a chart showing an example of the upstream optical signal during linked DBA control in the second embodiment of the present invention.

FIG. 16 is a drawing for time transition of the optical power on each wavelength input to the SOA, the total optical power input to the SOA, the SOA injection current, and the total optical power output from the SOA.

The linked DBA control section of the second embodiment of the present invention allocates bandwidth in the first-half of the DBA bandwidth allocation cycle to ONU having a small input optical power to the SOA; and to the latter-half of the DBA bandwidth allocation cycle to ONU having a large input optical power to the SOA. In ONU groups for wavelength λU1, the linked DBA control section allocates bandwidth allocation periods in the first-half region of the wideband allocation cycle to ONU1-1, ONU1-4 having an input power type of Low; allocates a bandwidth allocation period in the latter-half region of the bandwidth allocation cycle to ONU1-3 having an input power type of High; and allocates a bandwidth allocation period in the intermediate region of the bandwidth allocation cycle to the ONU1-5, ONU1-2 having an input power type of Middle. In ONU groups for wavelength λU2, the linked DBA control section allocates a bandwidth allocation period in the first-half region of the DBA bandwidth allocation cycle to ONU2-3, ONU2-4 having an input power type of Low; allocates a bandwidth allocation period in the latter-half region of the bandwidth allocation cycle to ONU2-2 having an input power of High; and allocates a bandwidth allocation period in the intermediate region of the bandwidth allocation cycle to ONU2-1 having an input power type of Middle. In ONU groups for wavelength λU3, the linked DBA control section allocates a bandwidth allocation period in the first-half region of the bandwidth allocation cycle to ONU3-1 having an input power type of Low; allocates a bandwidth allocation period in the latter-half region of the bandwidth allocation cycle to ONU3-2, ONUS-3 having an input power type of High; and allocates a bandwidth allocation period in the intermediate region of the bandwidth allocation cycle to ONU3-4 having an input power type of Middle. In ONU groups for wavelength λU4, the linked DBA control section allocates a bandwidth allocation period in the first-half region of the bandwidth allocation cycle to ONU4-3 having an input power type of Low; allocates a bandwidth allocation period in the latter-half region of the bandwidth allocation cycle to ONU4-2, ONU4-4 having an input power type of High; and allocates a bandwidth allocation period in the intermediate region of the bandwidth allocation cycle to ONU4-1 having an input power type of Middle.

When allocating bandwidth in this way, one can see that the bandwidth allocation cycles are grouped in the sequence of region A, region B, region D, and region E.

In the second embodiment of the present invention, the linked DBA control section commands the injection current control section to switch the injection current from I_high to I_low at the boundary of the region B and the region D.

In the second embodiment of the present invention, the linked DBA control section commands the injection current control section to switch the injection current so as to increase the injection current in the period that the SOA input power is Low, and reduce the injection current in the period that the SOA input power is High. Consequently, total output optical power of the SOA is below the saturation level, and waveform deformation caused by SOA saturation can be prevented.

[OLT and ONU Operation in the Second Embodiment of the Present Invention]

The operation is the same as the first embodiment so a description is omitted.

[Discovery Allocation Period and Normal Transfer Allocation Period in the Second Embodiment of the Present Invention]

The method for allocating the discovery allocation period and normal transfer allocation period in the second embodiment of the present invention is described next. In the second embodiment, the injection current is regulated based on the total input power to the SOA. In the discovery allocation period, the OLT might possibly receive optical signals from ONU whose distance is unknown, or in other words having an unknown input power. Due to these circumstances implementing control of the injection current only the linked DBA control section described above is impossible.

The second embodiment of the present invention therefore employs a method divided into a discovery allocation period that implements discovery on all wavelengths and a normal transfer allocation period that implements normal transfer on all wavelengths, the same as the method (2) described in the first embodiment of the present invention. In the normal transfer allocation period the bandwidth is allocated to each ONU by the above described linked DBA control section operation. These discovery allocation periods and normal transfer periods are alternately allocated. The operation is described while referring to FIG. 13.

In this discovery allocation period, the discovery period (Discovery) is allocated on all of the wavelengths λU1 through λU4. The linked DBA control section commands the injection current control section to set the injection current in the first-half of the discovery period to I_High in order to receive a discovery reply from an ONU at a distance far from an OLT in the first-half of the discovery period, and commands the injection current control section to set the injection current in the latter-half of the discovery period in order to receive a discovery reply from an ONU at a distance close to an OLT in the latter-half of the discovery period. If an ONU at a distance close to an OLT sent a discovery reply signal in the first-half of the discovery period where the injection current was set to I_high, then the discovery will fail in the case where an ONU at a distance far from an OLT that sent a discovery reply signal in the latter-half of the discovery period where the injection current was set to I_low. However, even if discovery fails, a discovery that succeeds in a discovery allocation period from then onwards is sufficient so that the system is not considered to have a particular problem. In order to reduce the probability that this phenomenon will occur, the discovery allocation period may be allocated over a longer period compared to the period in the related art implemented on one wavelength.

Moreover, instead of subdividing the discovery allocation period into a first-half and a latter-half and switching the SOA injection current, the injection current may be switched at each discovery allocation period. The injection current of a first discovery allocation period for example may be set to I_high, and the injection current of a second discovery allocation period may be set to I_low, and this process may be repeated. In the case that an ONU at a distance close to the OLT, sent a discovery reply signal at the first discovery allocation period, then the discovery will fail, but if a discovery reply signal is sent in the second discovery allocation period will succeed if there is no conflict with ONU on other wavelengths.

[Effect Rendered by the Second Embodiment of the Present Invention]

The effect rendered by the second embodiment of the present invention is described next. The second embodiment can achieve upstream transmission without saturating the optical amplifier, the same as the first embodiment. The second embodiment can therefore reduce the number of optical amplifiers utilized for receiving upstream OLT communications and achieve low-cost and compact OLT during multi-branching and line extension in WDM/TDM-PON systems.

This embodiment is moreover capable of regulating the injection current according to the input power so that the dynamic range which is the range of input power that the OLT can receive on each wavelength can be improved even further compared to the first embodiment.

Moreover, by controlling the injection current according to the input power, this embodiment can prevent saturation in the SOA even when the saturation level in the SOA is low. The specifications required of the SOA can therefore be made less strict. The example given above described controlling the SOA injection current but saturation of the optical amplifier can be prevented by regulating the gain of the optical amplifier.

Third Embodiment

The third embodiment of the present invention is described next. This description centers on those points differing from the first embodiment. In the first embodiment, when nearly all of the ONU are close to the OLT on at least one wavelength, the total input power to the SOA cannot be made to uniformly decrease even by interchanging the bandwidth allocation sequence to the ONU. This situation causes the phenomenon of allocating bandwidth from the next DBA bandwidth allocation cycle onwards to frequently occur which can be the cause of upstream transmission delays and a large drop in bandwidth efficiency. Therefore in the third embodiment, the optical power input to the SOA is made adjustable on each wavelength.

[OLT Configuration in the Third Embodiment of the Present Invention]

Figure 17:
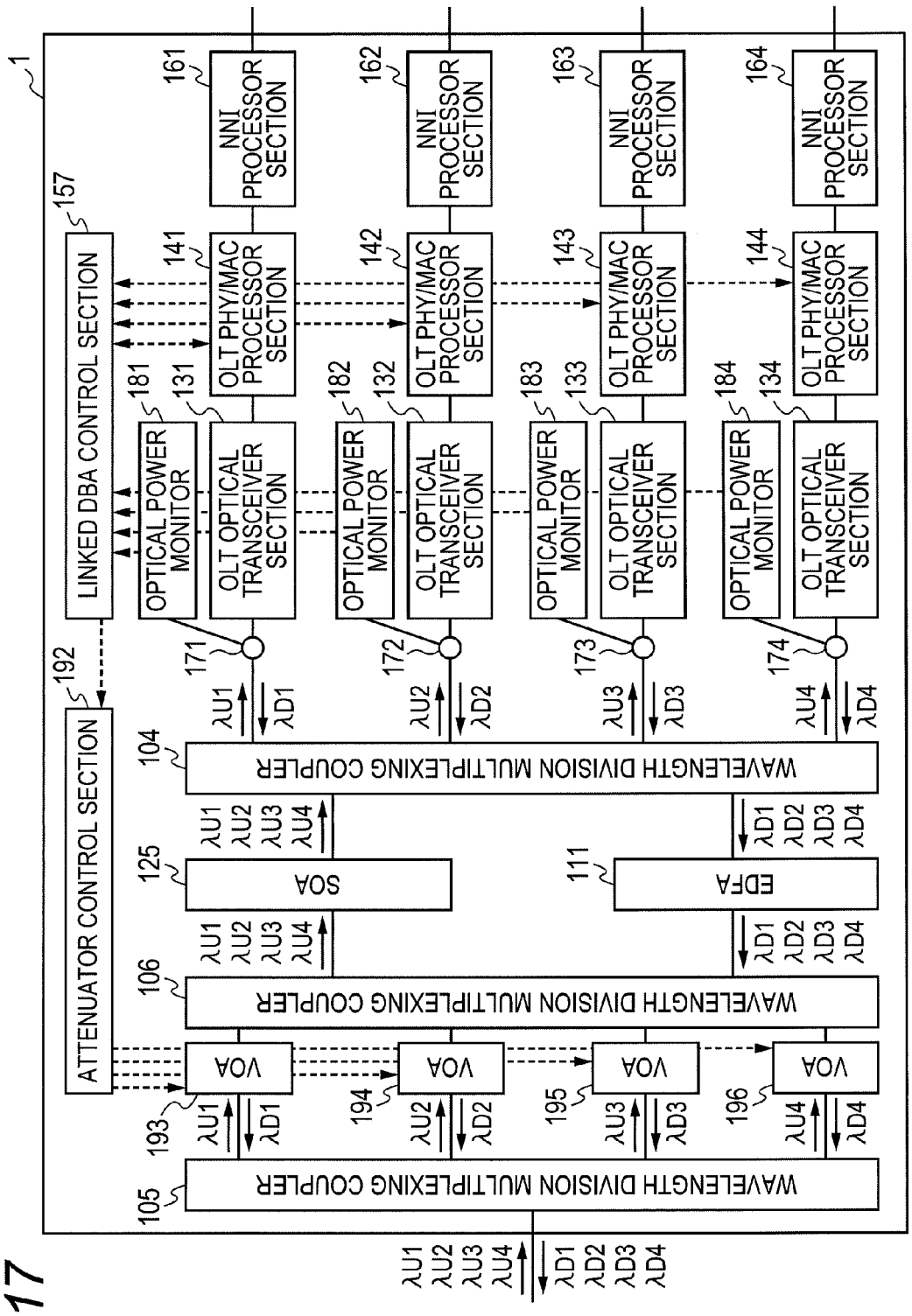
FIG. 17 is block diagram showing the configuration of the OLT in the third embodiment of the present invention.

The configuration of the OLT in the third embodiment of the present invention is described while referring to FIG. 17. In addition to the wavelength division multiplexing coupler 105-106, an EDFA 111, a SOA 125, a wavelength division multiplexing coupler 104, the OLT optical transceiver sections 131-134, the OLT PHY/MAC processor sections 141-144, a linked DBA control section 157, the NNI processor sections 161-164, the optical splitters 171-174, and the optical power monitors 181-184, the OLT is further comprised of an attenuator control section 192, and the VOA (variable optical attenuator) 193-196. The points differing from the first embodiment are that this embodiment further includes the VOA (variable optical attenuator) 193-196 to allow attenuation on each wavelength group, and the attenuator control section 192 to control the variable optical attenuators.

The operation of the EDFA 111, a SOA 125, a wavelength division multiplexing coupler 104, the optical splitters 171-174, the OLT optical transceiver sections 131-134, the OLT PHY/MAC processor sections 141-144, the NNI processor sections 161-164, and the optical power monitors 181-184 is the same as the first embodiment so a description is omitted here.

The linked DBA control section 157 sets the bandwidth allocation information for each ONU based on the requested bandwidth amount from each ONU input from the OLT PHY/MAC processor sections 141-144 and the ONU power management table held by the linked DBA control section 157 and outputs that information to the OLT PHY/MAC processor sections 141-144. The linked DBA control section 157 also registers the corresponding ONU-ID and ONU optical power information in the ONU power management table based on the ONU optical power information received from the optical power monitors 181-184 during the ONU registration.

Moreover, the linked DBA control section 157 of the third embodiment sets the attenuation amount on each wavelength based on the ONU power management table and outputs that attenuation amount information to the attenuator control section 192.

The attenuator control section 192 controls the attenuation amount in the VOA (variable optical attenuator) 193-196 based on the attenuation amount information input from the linked DBA control section 157.

The VOA 193-196 attenuate the upstream optical signals for each of the wavelengths λU1-λU4 output from the wavelength division multiplexing coupler 105 by an amount equal just to the attenuation amount commanded by the attenuator control section 192 and outputs those attenuated signals to the wavelength division multiplexing coupler 106. The VOA 193-196 also attenuates the downstream optical signals for each of the wavelengths λD1-λD4 output from the wavelength division multiplexing coupler 106 by an amount equal just to the attenuation amount commanded by the attenuator control section 192, and outputs the attenuated signals to the wavelength division multiplexing coupler 105.

In this configuration of the present invention, the linked DBA control section 157 is capable of setting the bandwidth allocation information to each ONU based on the requested bandwidth amount from each ONU on each wavelength and the input power from each ONU. The linked DBA control section 157 can also control the attenuation amount in each wavelength group based on the ONU power management table.

[Operation During Normal Transfer in the Linked DBA Control Section of the Third Embodiment of the Present Invention]

Figure 18:
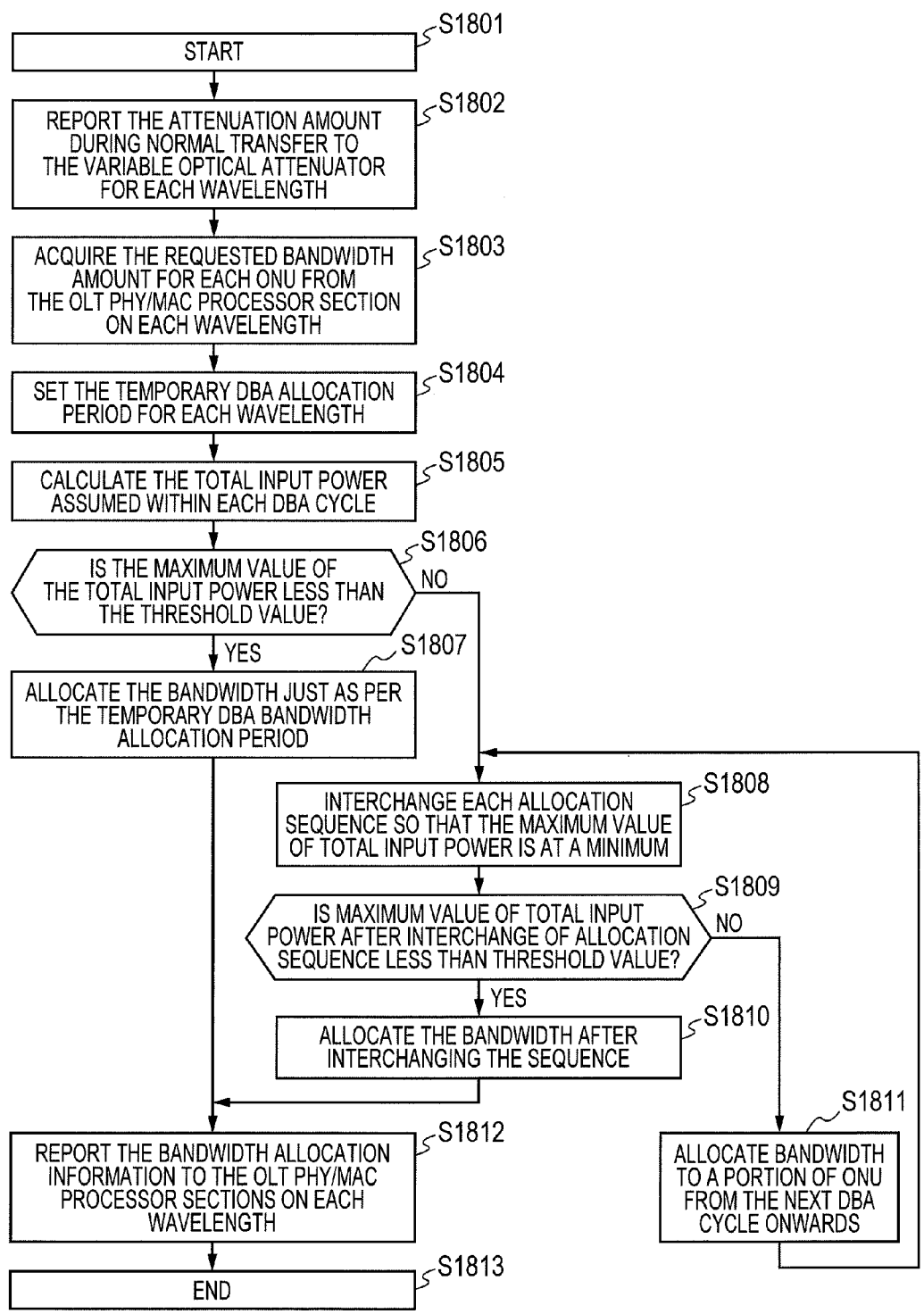
FIG. 18 is a flowchart showing the operation during normal transfer in the linked DBA control section of the third embodiment of the present invention.

The linked DBA control of the third embodiment is largely the same as the first embodiment. The current embodiment differs from the first embodiment in that a variable optical attenuator has been added. The operation during normal transfer in the linked DBA control section of the third embodiment is first of all described while referring to FIG. 18.

In S1801, the linked DBA control section starts normal transfer operation.

In S1802, the linked DBA control section reports the attenuation amount during normal transfer to the variable optical attenuator for each wavelength, and the operation shifts to S1803. The attenuation amount reported here is the attenuation amount value that is set in the operation during discovery.

The operation of the linked DBA control section from S1803 to S1813 is the same as the operation in the first embodiment so a description is omitted here.

[Example of Upstream Optical Signal in the Third Embodiment of the Present Invention]

The third embodiment is largely the same as the first embodiment. The third embodiment differs from the point that the input power to the SOA is attenuated by a variable optical attenuator for each wavelength.

[Operation of OLT and ONU in the Third Embodiment of the Present Invention]

The operation of the third embodiment here is the same as the operation in the first embodiment so a description is omitted.

[Operation During Discovery in the Linked DBA Control Section in the Third Embodiment of the Present Invention]

Figure 19:
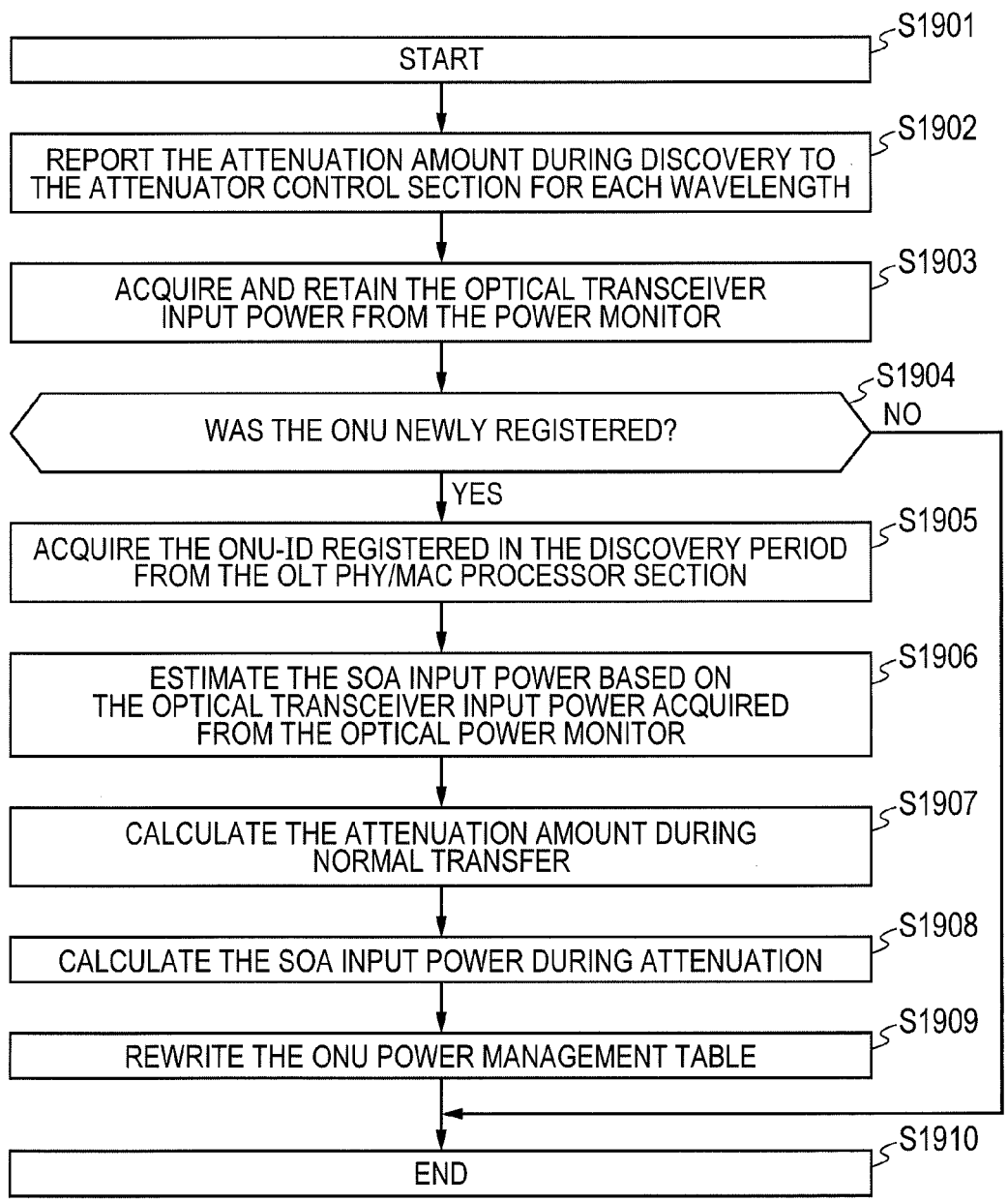
FIG. 19 is a flowchart showing the operation during discovery in the linked DBA control section of the third embodiment of the present invention.

Next, the operation during discovery in the linked DBA control section is described while referring to FIG. 19. The input power range receivable by the OLT when the attenuation amount of the variable optical attenuator is 0 dB is set as $P\_rx\_min$ through $P\_rx\_max$.

In S1901 the operation during discovery starts and the operation proceeds to S1902.

In S1902, the linked DBA control section reports the attenuation amount during discovery to the attenuation control section. The attenuation amount may for example be set to 0 dB. The attenuation amount during discovery that should be set here may be any value if capable of receiving either the ONU at the closest distance or the ONU at the farthest distance as established in the system during discovery.

The operation from S1903 to S1906 is the same as the operation in the first embodiment so a description is omitted here. When the process is completed in S1906, the operation proceeds to S1907.

In S1907, the linked DBA control section calculates the attenuation amount that should be set during normal transfer. The linked DBA control section finds the wavelength that newly registered ONU transmits on, and acquires the SOA input power of all the ONU registered on that wavelength. Among the acquired SOA input power, the maximum SOA input power is set as $P\_max$ and the minimum SOA input power is set as $P\_min$. The value $ATT\_max$ where the ATT is maximum is set at an ATT that satisfies $P\_min/ATT\_ \geq P\_rx\_min$ and further satisfies $P\_max/ATT \leq P\_rx\_max$. When set in this way, the registered ONU can be received during normal transfer, moreover the attenuation amount can be increased as much as possible. After calculation of the attenuation amount is complete, the operation shifts to S1908.

In S1908, the linked DBA control section calculates the SOA input power when the attenuation amount is $ATT\_max$ for all ONU registered on the wavelength that the newly registered ONU transmits on, and also for ONU that should be newly registered. After completing the calculation the operation shifts to S1909.

In S1909, the ONU power management table is rewritten based on the SOA input power calculated in S1908. After rewriting the ONU power management table, the operation shifts to S1910.

In S1910, the operation during discovery ends.

By performing the processing from S1901 through S1910, the attenuation amount of the variable optical attenuator on the applicable wavelength is calculated just for newly registered ONU, and the ONU power management table can then be rewritten.

[Discovery Allocation Period and Normal Transfer Allocation Period in the Third Embodiment of the Present Invention]

The allocation of the discovery allocation period and normal transfer allocation period is the same as the allocation in the first embodiment. In the discovery allocation period, the attenuation amount on the variable optical attenuator is set to 0 dB, and during normal transfer the upstream optical signal input to the OLT is attenuated by an attenuation amount set in the variable optical attenuator for each wavelength.

[Effect of the Third Embodiment of the Present Invention]

In addition to the effects described for the first embodiment, the third embodiment renders the effect of preventing additional delays and drops in bandwidth utilization efficiency even in cases where the ONU are all at close distances on at least one or more wavelengths.

[Supplemental Description]

In the present description, a multiplexed wavelength carrying four waves was utilized however the present invention can be applied regardless of the multiplexed wavelength number. The greater the number of multiplexed wavelengths, the higher the total optical power input to the SOA becomes so that the effect rendered by the present invention is increased to a further level.

The present invention was described based on frames defined for 10G-EPON, however the present invention can be applied in the same way to frames defined by other TDM-PON such as E-PON, G-PON, XG-PON.

The description for the second embodiment described utilizing a binary value to switch the injection current however a binary value need not always be utilized. A ternary value or higher may for example be utilized to switch the injection current.

What is claimed is:

1. An optical line terminal comprising;
    a first optical receiver section to receive optical wavelength multiplexed signals as multiplexed optical signals from a plurality of optical network units (ONU);
    a bandwidth allocation control section to allocate the transmit bandwidth to each of the optical network units based on the bandwidth allocation request from the optical network unit included in the multiplexed optical signal received by way of the first optical receiver section;
    an optical transmitter section to transmit bandwidth allocation information including information on the transmit bandwidth allocated by the bandwidth allocation control section to the optical network unit,
    wherein the bandwidth allocation control section sets the transmit bandwidth to the optical network unit on the transmit wavelength that is a first wavelength, based on a bandwidth allocation request from the plurality of optical network units whose transmit wavelength is a first wavelength, and a bandwidth allocation request from the plurality of optical network units whose transmit wavelength is a second wavelength; and
    an optical amplifier section to amplify the optical wavelength multiplexed signal and output the amplified signal,
    wherein the bandwidth allocation control section allocates the transmit bandwidth to each of the optical network units at each bandwidth allocation period for each wavelength based on the optical power of the optical wavelength multiplexed signals received from each optical network unit that were input to the optical amplifier.

2. The optical line terminal according to claim 1,
wherein the bandwidth allocation control section allocates the transmit bandwidth to each of the optical network units so that the optical power of the optical wavelength multiplexed signal input from the plurality of optical network units to the optical amplifier is below a specified threshold value.

3. The optical line terminal according to claim 1,
wherein the bandwidth allocation control section sets the transmit bandwidth for each wavelength based on the bandwidth allocation request from the plurality of optical network units on the same transmit wavelength, and further calculates the optical power of the optical wavelength multiplexed signal input to the optical amplifier when the optical network units sent an optical signal based on the applicable transmit bandwidth that was set; and changes the transmit sequence among optical network units on the same transmit wavelength when the applicable optical power exceed the specified threshold.

4. The optical line terminal according to claim 1, comprising:
a first wavelength division multiplexing coupler;
a second optical receiver section to convert the optical signals on each wavelength output from the first wavelength division multiplexing coupler into electrical signals and output the electrical signals; and
a processor section to extract the bandwidth allocation request sent from the plurality of optical network units from the electrical signals output from the second receiver section and output that bandwidth allocation request to the bandwidth allocation control section.

5. The optical line terminal according to claim 1,
wherein when registering new optical network units, the bandwidth allocation section allocates a registration period to prohibit transmission on already registered optical network units on the same wavelength to the same period among the plural wavelengths.

6. The optical line terminal according to claim 1 comprising:
a gain regulator section to set the gain of the optical amplifier based on the optical power of the optical wavelength multiplexed signal input to the optical amplifier.

7. The optical line terminal according to claim 1,
wherein the bandwidth allocation control section allocates a transmit bandwidth to optical network units within the same transmit wavelength so that the difference among the optical power of each optical signal of the optical wavelength multiplexed signal input to the optical amplifier is small.

8. The optical line terminal according to claim 1, further comprising:
an injection current control section to set the injection current to the optical amplifier based on the optical power of the optical wavelength multiplexed signal input to the optical amplifier,
wherein the optical amplifier is a semiconductor optical amplifier.

9. The optical line terminal according to claim 1, comprising:
a variable optical attenuator section to attenuate the power of the optical signals on each wavelength input to the optical amplifier; and
an attenuator control section to control the attenuation amount of the variable optical attenuator section;
wherein the bandwidth allocation control section sets the wavelength to attenuate the power of the optical signal, based on the optical power of the optical wavelength multiplexed signal input from the plurality of optical network units, and
wherein the attenuator control section controls the attenuation amount of the variable optical attenuator section on the wavelength that was set.

10. The optical line terminal according to claim 3,
wherein the bandwidth allocation control section allocates a transmit bandwidth to a portion of the optical network units among all of the optical network units from the next bandwidth allocation cycle onwards when the input power of the optical wavelength multiplexed signal does not drop below the threshold value.

11. The optical line terminal according to claim 1,
wherein, in the period for sending an optical signal to register a newly coupled optical network unit, the bandwidth allocation control section switches the gain set in the gain regulator section to a first period or a second period among the periods.

12. The optical line terminal according to claim 1,
wherein the bandwidth allocation control section sets the attenuation amount in the variable optical attenuator to zero when sending an optical signal to register a newly coupled optical network unit.

13. An optical network system comprising:
a plurality of optical network units; and
an optical line terminal coupled by way of an optical splitter and a wavelength division multiplexing coupler to the optical network units,
wherein the optical network units includes:
an optical receiver section to receive bandwidth allocation information sent from the optical line terminal; and
an optical transmitter section to send optical signals based on bandwidth allocation information received from the optical receiver section,
wherein the optical line terminal includes:
a first optical receiver section to receive optical wavelength multiplexed signal that are multiplexed optical signals from a plurality of optical network units;
a bandwidth allocation control section to allocate the transmit bandwidth to each of the optical network units based on the bandwidth allocation request from the optical network unit included in the multiplexed optical signal received by way of the first optical receiver section;
a transmit section to transmit bandwidth allocation information including information on the transmit bandwidth allocated by the bandwidth allocation control section to the optical network unit, and
wherein the bandwidth allocation control section sets the transmit bandwidth to the optical network unit on the transmit wavelength that is a first wavelength, based on a bandwidth allocation request from the plurality of optical network units whose transmit wavelength is a first wavelength, and a bandwidth allocation request from the plurality of optical network units whose transmit wavelength is a second wavelength; and
an optical amplifier section to amplify the optical wavelength multiplexed signal and output the amplified signal,
wherein the bandwidth allocation control section allocates the transmit bandwidth to each of the optical network units at each bandwidth allocation period for each transmit wavelength based on the optical power of the optical wavelength multiplexed signals received from each optical network unit that were input to the optical amplifier.

* * * * *